US012583282B2

(12) United States Patent
Miyakoshi et al.

(10) Patent No.: US 12,583,282 B2
(45) Date of Patent: Mar. 24, 2026

(54) VEHICLE AIR CONDITIONING APPARATUS

(71) Applicant: SANDEN CORPORATION, Gunma (JP)

(72) Inventors: Ryo Miyakoshi, Gunma (JP); Megumi Shigeta, Gunma (JP); Yoshiyuki Okamoto, Gunma (JP)

(73) Assignee: SANDEN CORPORATION, Gunma (JP)

( * ) Notice: Subject to any disclaimer, the term of this patent is extended or adjusted under 35 U.S.C. 154(b) by 175 days.

(21) Appl. No.: 18/550,415

(22) PCT Filed: Mar. 22, 2022

(86) PCT No.: PCT/JP2022/013276
§ 371 (c)(1),
(2) Date: Sep. 13, 2023

(87) PCT Pub. No.: WO2022/202841
PCT Pub. Date: Sep. 29, 2022

(65) Prior Publication Data
US 2024/0157756 A1 May 16, 2024

(30) Foreign Application Priority Data
Mar. 24, 2021 (JP) ................................. 2021-050515

(51) Int. Cl.
*F25B 41/20* (2021.01)
*B60H 1/00* (2006.01)
(Continued)

(52) U.S. Cl.
CPC ..... *B60H 1/00328* (2013.01); *B60H 1/00021* (2013.01); *B60H 1/00278* (2013.01);
(Continued)

(58) Field of Classification Search
CPC ............ B60H 1/00328; B60H 1/00021; B60H 1/00278; B60H 1/00807; B60H 1/00914;
(Continued)

(56) References Cited

U.S. PATENT DOCUMENTS

2002/0036080 A1* 3/2002 Itoh ........................ F25B 41/385
165/231

FOREIGN PATENT DOCUMENTS

JP 2013-241094 A 12/2013
JP 2014-196018 A 10/2014
(Continued)

OTHER PUBLICATIONS

Shigeta et al., Vehicle Air Conditioner, Apr. 4, 2019, JP2019051890A, Whole Document (Year: 2019).*
(Continued)

*Primary Examiner* — Larry L Furdge
(74) *Attorney, Agent, or Firm* — Rankin, Hill & Clark LLP

(57) ABSTRACT

A vehicle air conditioning apparatus includes: a refrigerant circuit including a compressor configured to compress refrigerant, an outdoor heat exchanger configured to perform a heat exchange between the refrigerant and outdoor air, and a heat absorption heat exchanger configured to absorb heat from a heat-absorbed subject into the refrigerant; and a controller configured to control the refrigerant circuit. The controller can selectively perform defrosting modes including: a hot gas defrosting mode to defrost the outdoor heat exchanger by the refrigerant compressed by the compressor; and a heat absorption defrosting mode to defrost the outdoor heat exchanger by the refrigerant absorbing the heat from the heat-absorbed subject and compressed by the compressor. The controller sets a selecting condition to preferentially select the heat absorption defrosting mode, and a switching
(Continued)

condition to switch the heat absorption defrosting mode to the hot gas defrosting mode and performs the hot gas defrosting mode.

11 Claims, 11 Drawing Sheets

(51) Int. Cl.

| | |
|---|---|
| *B60H 1/22* | (2006.01) |
| *F25B 5/02* | (2006.01) |
| *F25B 5/04* | (2006.01) |
| *F25B 6/04* | (2006.01) |
| *F25B 47/02* | (2006.01) |
| *F25B 49/02* | (2006.01) |
| *F25B 40/02* | (2006.01) |

(52) U.S. Cl.

CPC ..... *B60H 1/00807* (2013.01); *B60H 1/00914* (2013.01); *B60H 1/00921* (2013.01); *B60H 1/2218* (2013.01); *F25B 5/02* (2013.01); *F25B 5/04* (2013.01); *F25B 6/04* (2013.01); *F25B 41/20* (2021.01); *F25B 47/022* (2013.01); *F25B 49/02* (2013.01); *B60H 2001/00114* (2013.01); *B60H 2001/00307* (2013.01); *B60H 1/00428* (2013.01); *B60H 2001/00961* (2019.05); *F25B 40/02* (2013.01); *F25B 2400/0403* (2013.01); *F25B 2400/0409* (2013.01); *F25B 2400/0411* (2013.01); *F25B 2600/2501* (2013.01); *F25B 2600/2513* (2013.01); *F25B 2700/195* (2013.01); *F25B 2700/21151* (2013.01); *F25B 2700/21161* (2013.01); *F25B 2700/21162* (2013.01); *F25B 2700/21163* (2013.01)

(58) Field of Classification Search

CPC ... B60H 1/00921; B60H 1/2218; F25B 41/20; F25B 5/02

See application file for complete search history.

(56) References Cited

FOREIGN PATENT DOCUMENTS

| | | | | |
|---|---|---|---|---|
| JP | 2015-048041 | A | | 3/2015 |
| JP | 2019-001244 | A | | 1/2019 |
| JP | 2019-018708 | A | | 2/2019 |
| JP | 2019051890 | A | * | 4/2019 |
| JP | 2020-079004 | A | | 5/2020 |

OTHER PUBLICATIONS

Kato et al., Heat Pump Cycle, Jul. 18, 2013, JP2013139252A, Whole Document (Year: 2013).*

International Search Report dated Jun. 14, 2022 filed in PCT/JP2022/013276.

Written Opinion dated Jun. 14, 2022 filed in PCT/JP2022/013276.

English Translation of Written Opinion dated Jun. 14, 2022 filed in PCT/JP2022/013276.

* cited by examiner

VEHICLE AIR CONDITIONING APPARATUS

TECHNICAL FIELD

The present invention relates to a vehicle air conditioning apparatus applicable to a vehicle, and specifically to a vehicle air conditioning apparatus configured to defrost an outdoor heat exchanger.

BACKGROUND ART

Conventionally, an air conditioning apparatus applicable to a vehicle includes a refrigerant circuit in which a compressor, an indoor heat exchanger (serving as an evaporator during cooling and as a condenser during heating), an outdoor heat exchanger (serving as a condenser during cooling and as an evaporator during heating), and an expansion valve are connected, and is configured to perform air conditioning by supplying a vehicle compartment with air having been subjected to a heat exchange with refrigerant in the indoor heat exchanger.

In this vehicle air conditioning apparatus, the outdoor heat exchanger functions as a heat absorbing device during the heating operation, and therefore, when the outdoor temperature is low, condensed water is frozen on the surface of the outdoor heat exchanger and consequently frost may be formed. When the frost is formed on the outdoor heat exchanger, the heat transfer coefficient is decreased so that sufficient heat is not absorbed. Therefore, it is not possible to sufficiently heat the vehicle compartment, and consequently it is required to perform defrosting operation. For example, there has been known a vehicle air conditioning apparatus configured to perform the defrosting operation with appropriate performance depending on the situation when the frost is formed on the outdoor heat exchanger, by switching between a strong defrosting operation mode to circulate the refrigerant through the outdoor heat exchanger and a weak defrosting operation mode to bypass the outdoor heat exchanger after the refrigerant discharged from a compressor is flowed to an indoor heat exchanger (for example, Patent Literature 1).

CITATION LIST

Patent Literature

PTL1: Japanese Patent Application Laid-Open No. 2014-196018

SUMMARY OF INVENTION

Problem to be Solved by the Invention

However, in the vehicle air conditioning apparatus disclosed in the above-described Patent Literature 1, during the defrosting in the strong defrosting operation mode, heat loss in the pipes and the heat release from the outdoor heat exchanger are large, and therefore the amount of heat required for the defrosting is not sufficient only by the heat from the compressor. Consequently, it may take time for the defrosting, or it may not be possible to evenly remove the frost. Meanwhile, the weak defrosting operation mode is selected to melt the frost on the outdoor heat exchanger in a case where the frost is formed on the outdoor heat exchanger during the heating when the outdoor temperature is relatively high (higher than 0 degrees Celsius). In this operation mode, the refrigerant is not circulated in the outdoor heat exchanger, and therefore not to actively defrost the outdoor heat exchanger, and consequently the frost may not be evenly removed.

The invention is proposed to address the above-described problems, and it is therefore an object of the invention to rapidly, surely and evenly remove the frost depending on the situation of a vehicle.

Solution to Problem

An aspect of the invention provides a vehicle air conditioning apparatus including: a refrigerant circuit including a compressor configured to compress refrigerant, an outdoor heat exchanger configured to perform a heat exchange between the refrigerant and outdoor air, and a heat absorption heat exchanger configured to absorb heat from a heat-absorbed subject into the refrigerant; and a controller configured to control the refrigerant circuit. The controller can selectively perform a plurality of defrosting modes including: a hot gas defrosting mode to defrost the outdoor heat exchanger by the refrigerant compressed by the compressor; and a heat absorption defrosting mode to defrost the outdoor heat exchanger by the refrigerant absorbing the heat from the heat-absorbed subject and compressed by the compressor. The controller sets a selecting condition to preferentially select the heat absorption defrosting mode, and a switching condition to switch the heat absorption defrosting mode to the hot gas defrosting mode and performs the hot gas defrosting mode.

Effect of the Invention

According to the invention, it is possible to rapidly, surely and evenly remove the frost depending on the situation of a vehicle.

DESCRIPTION OF EMBODIMENTS

Hereinafter, an embodiment of the invention will be described in detail with reference to the drawings. In the description below, the same reference number in different drawings denotes the same component with the same function, and duplicate description for each of the drawings is omitted accordingly.

Figure 1:
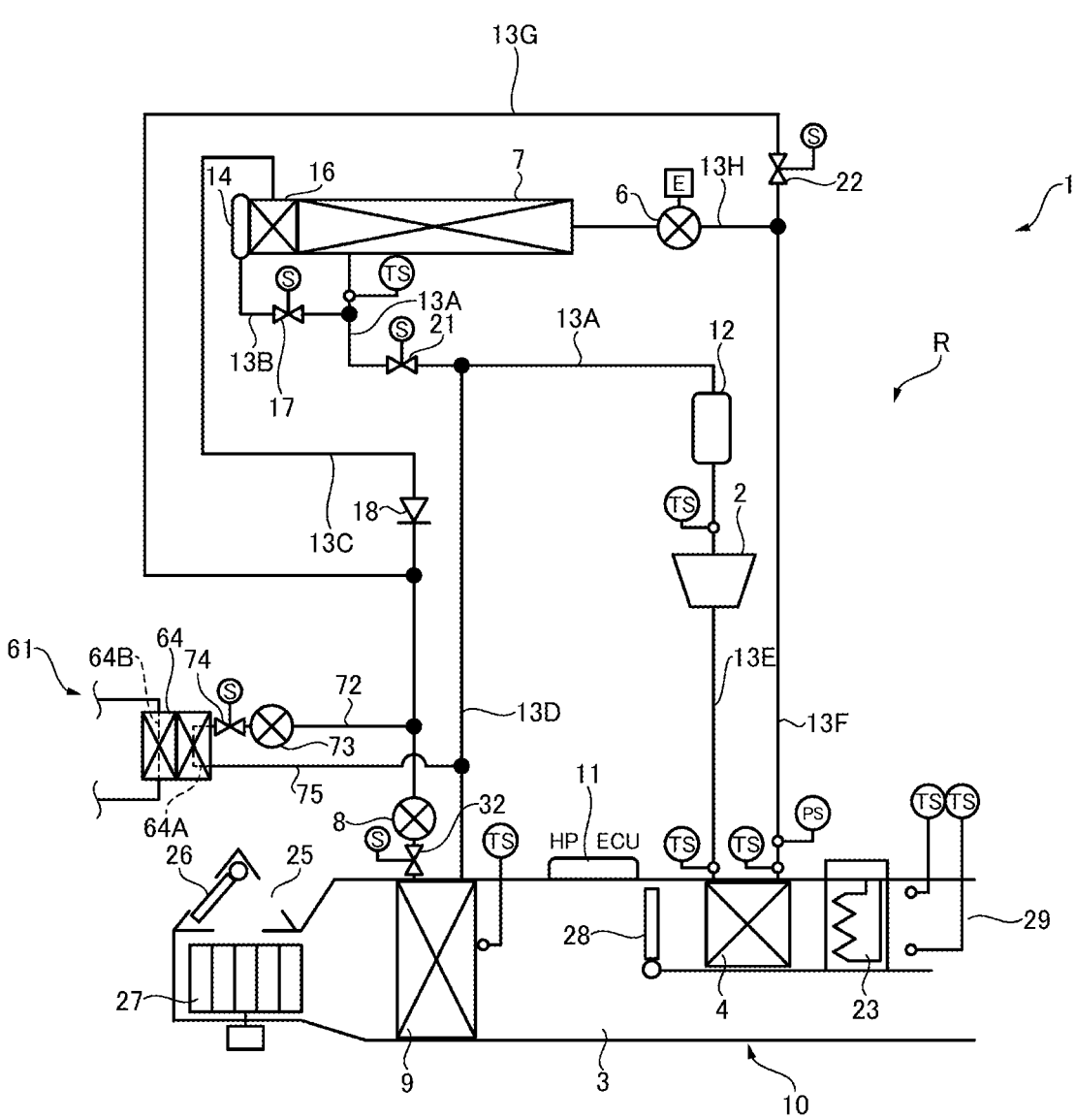
FIG. 1 illustrates a schematic configuration of a refrigerant circuit of a vehicle air conditioning apparatus according to an embodiment of the invention.

FIG. 1 illustrates a schematic configuration of a vehicle air conditioning apparatus 1 according to an embodiment of the invention. The vehicle air conditioning apparatus 1 is applicable to vehicles, for example, an electric vehicle (EV) without an engine (internal combustion), and a so-called hybrid vehicle using an engine and an electric drive motor together. This vehicle includes a battery (e.g. a lithium battery), and is configured to drive and run by supplying the power of the battery charged by an external power source to a motor unit including the drive motor. Also the vehicle air conditioning apparatus 1 is driven by the power supplied from the battery.

The vehicle air conditioning apparatus 1 according to the present embodiment includes a refrigerant circuit R, and performs heat pump operation with use of the refrigerant circuit R to perform air conditioning (heating, cooling, dehumidifying, ventilating, and defrosting) of a vehicle compartment. In addition, a heat medium circuit connected to the refrigerant circuit R is used to cool and warm up electric devices such as a battery and a motor. Here, in the description below, "refrigerant" is circulating medium whose state varies (compressed, condensed, expanded, and evaporated) in a heat pump of the refrigerant circuit, and "heat medium" is medium configured to absorb and release heat without varying its state.

The refrigerant circuit R includes: an electric motor-driven compressor 2 configured to compress refrigerant, an indoor condenser (heat releasing device) 4, as an indoor heat exchanger, provided in an air flow passage 3 of an HVAC unit 10 through which the air of the vehicle compartment is ventilated and circulated, and configured to release the heat from the refrigerant having a high temperature and a high pressure discharged from the compressor 2 and heat the air to be supplied into the vehicle compartment; an outdoor expansion valve 6 configured to decompress and expand the refrigerant during the heating; an outdoor heat exchanger 7 functioning as a heat releasing device (condenser) to release the heat from the refrigerant during the cooling, and configured to perform a heat exchange between the refrigerant and the outdoor air to function as an evaporator to absorb the heat into the refrigerant during the heating; an indoor expansion valve 8 configured to decompress and expand the refrigerant; a heat absorbing device 9 provided in the air flow passage 3 and configured to absorb the heat into the refrigerant from the inside and the outside of the vehicle compartment to cool the air to be supplied into the vehicle compartment during the cooling and the dehumidifying; and an accumulator 12, which are connected by refrigerant pipes 13A to 13H.

The outdoor expansion valve 6 and the indoor expansion valve 8 are electronic expansion valves driven by a pulse motor (not illustrated), and the degree of opening of them is appropriately controlled between the full closing and the full opening based on the number of pulses applied to the pulse motor. The outdoor expansion valve 6 decompresses and expands the refrigerant having flowed from the indoor condenser 4 and flowing into the outdoor heat exchanger 7. In addition, during the heating using the outdoor heat exchanger 7, the degree of opening of the outdoor expansion valve 6 is controlled by a heat pump ECU 11 described later, so as to make a SC (sub-cooling) value as an indicator of the achievement of supercooling at the refrigerant outlet of the indoor condenser 4 attain to a predetermined target value (SC control). The indoor expansion valve 8 decompresses and expands the refrigerant flowing into the heat absorbing device 9, and adjusts the degree of superheat of the refrigerant in the heat absorbing device 9.

An outdoor blower (not illustrated) is provided in the outdoor heat exchanger 7. The outdoor blower forcibly ventilates the outdoor heat exchanger 7 by the outdoor air to cause a heat exchange between the outdoor air and the refrigerant, and allows the outdoor heat exchanger 7 to be ventilated by the outdoor air even during the stop of the vehicle.

A receiver dryer 14 and a supercooling device 16 are provided in the outdoor heat exchanger 7 on the downstream side with respect to the refrigerant flow. The refrigerant outlet side of the outdoor heat exchanger 7 is connected to the receiver dryer 14 via the refrigerant pipe 13A and the refrigerant pipe 13B branching from the refrigerant pipe 13A. A solenoid valve 17 (for cooling) is provided in the refrigerant pipe 13B, as an on-off valve configured to open to flow the refrigerant to the heat absorbing device 9.

The outlet side of the supercooling device 16 is connected to the refrigerant inlet side of the heat absorbing device 9 via the refrigerant pipe 13C. A check valve 18, an indoor expansion valve 8 and a solenoid valve 32 as an indoor heat exchanger valve (on-off valve) are provided in the refrigerant pipe 13C in this order from the outdoor heat exchanger 7 side. The check valve 18 is provided in the refrigerant pipe 13C such that the direction toward the heat absorbing device 9 is the forward direction.

Meanwhile, a solenoid valve 21 (for heating) as an on-off valve configured to open during the heating, the accumulator 12 and the compressor 2 are connected in series to the refrigerant pipe 13A extending from the outdoor heat exchanger 7. The refrigerant pipe 13A branches into the refrigerant pipe 13D between the outlet side of the solenoid valve 21 and the inlet side of the accumulator 12, and the refrigerant pipe 13D is connected to the refrigerant outlet side of the heat absorbing device 9.

The refrigerant outlet of the compressor 2 is connected to the refrigerant inlet of the indoor condenser 4 by the refrigerant pipe 13E. One end of the refrigerant pipe 13F is connected to the refrigerant outlet of the indoor condenser 4, and the other end of the refrigerant pipe 13F branches into the refrigerant pipe 13G and the refrigerant pipe 13H upstream of the outdoor expansion valve 6 (with respect to the refrigerant flow).

The refrigerant pipe 13H branched from the refrigerant pipe 13F is connected to the refrigerant inlet of the outdoor heat exchanger 7 via the outdoor expansion valve 6. Meanwhile, the refrigerant pipe 13G branched from the refrigerant pipe 13F is connected to the refrigerant pipe 13C between the check valve 18 and the indoor expansion valve 8. A solenoid valve 22 is provided in the refrigerant pipe 13G upstream from the connection point to the refrigerant pipe 13C with respect to the refrigerant flow.

By this means, the refrigerant pipe 13G is connected in parallel to a series circuit including the outdoor expansion valve 6, the outdoor heat exchanger 7 and the check valve 18, and forms a bypass circuit configured to bypass the outdoor expansion valve 6, the outdoor heat exchanger 7, and the check valve 18.

An outdoor air intake port and an indoor air intake port (representatively illustrated as "intake port 25" in FIG. 1) are formed upstream of the heat absorbing device 9 with respect to the air flow in the air flow passage 3. A intake switching damper 26 is provided in the intake port 25. The intake switching damper 26 appropriately switches between the indoor air which is the air in the vehicle compartment (indoor air circulation) and the outdoor air which is the air outside the vehicle compartment (outdoor air introduction) to introduce the air from the intake port 25 into the air flow passage 3. An indoor blower (blower fan) 27 is provided downstream of the intake switching damper 26 with respect to the air flow, and configured to supply the introduced indoor air and outdoor air to the air flow passage 3.

In FIG. 1, an auxiliary heater 23 functions as an auxiliary heating device. The auxiliary heater 23 is an electric heater such as a PTC heater, and is provided in the air flow passage 3 on the downstream side of the indoor condenser 4 with respect to the air flow of the air flow passage 3. The auxiliary heater 23 is turned on and generates heat to supplement the heating in the vehicle compartment.

An air mix damper 28 is provided upstream of the indoor condenser 4 with respect to the air flow in the air flow passage 3, and configured to adjust the ratio between the indoor condenser 4 and the auxiliary heater 23 through which the air (the indoor air and the outdoor air) having flowed into the air flow passage 3 and passed through the heat absorbing device 9 is ventilated.

Here, as auxiliary heating means, for example, it may circulate hot water heated by the waste heat of the compressor through a heater core disposed in the air flow passage 3 to heat the air to be sent.

A refrigerant-heat medium heat exchanger 64 is connected to the refrigerant circuit R. The refrigerant-heat medium heat exchanger 64 includes a refrigerant flow path 64A and a heat medium flow path 64B, and constitutes part of the refrigerant circuit R and also part of a heat medium circuit 61 such as a device temperature adjustment circuit (not illustrated).

To be more specific, the refrigerant-heat medium heat exchanger 64 is connected to the refrigerant circuit R as follows.

One end of a refrigerant pipe 72 as a branching circuit is connected to the refrigerant circuit R downstream of the check valve 18 provided in the refrigerant pipe 13C and upstream of the indoor expansion valve 8 with respect to the refrigerant flow. A chiller expansion valve 73, and a solenoid valve 74 as an on-off valve are provided in the refrigerant pipe 72.

The chiller expansion valve 73 is an electronic expansion valve driven by a pulse motor (not illustrated), and has the degree of opening which is appropriately controlled between the full closing and the full opening based on the number of pulses applied to the pulse motor.

The chiller expansion valve 73 decompresses and expands the refrigerant flowing into the refrigerant flow path 64A of the refrigerant-heat medium heat exchanger 64, and adjusts the degree of superheat of the refrigerant in the refrigerant flow path 64A of the refrigerant-heat medium heat exchanger 64.

In the refrigerant-heat medium heat exchanger 64, the other end of the refrigerant pipe 72 is connected to the inlet of the refrigerant flow path 64A, and one end of a refrigerant pipe 75 is connected to the outlet of the refrigerant flow path 64A. The other end of the refrigerant pipe 75 is connected to the refrigerant pipe 13D upstream from the heat exchanger 9 with respect to the refrigerant flow. In this way, the chiller expansion valve 73, the solenoid valve 74, and the refrigerant flow path 64A of the refrigerant-heat medium heat exchanger 64 also constitute part of the refrigerant circuit R, and constitute part of the heat medium circuit 61.

When the chiller expansion valve 73 is open, part or the whole of the refrigerant having circulated through the refrigerant circuit R and flowed from the refrigerant pipe 13G and the outdoor heat exchanger 7 flows into the refrigerant pipe 72, is decompressed by the chiller expansion valve 73, flows into the refrigerant flow path of the refrigerant-heat medium heat exchanger 64, and evaporates. The heat medium flows into the heat medium flow path 64B. For example, when the heat medium circuit 61 is a device temperature adjustment circuit, the heat medium circulating through temperature-adjusted subjects such as a battery and a motor unit flows into the heat medium flow path 64B.

While flowing through the refrigerant flow path 64A of the refrigerant-heat medium heat exchanger 64, the refrigerant absorbs the heat from the heat medium flowing through the heat medium flow path 64B. By this means, when the heat medium circuit 61 is a device temperature adjustment circuit, the heat medium circuit 61 performs a heat exchange between the heat medium circulating in the temperature-adjusted subjects such as a battery and a motor unit and the refrigerant circulating through the refrigerant circuit R to adjust the temperatures of the battery and the motor unit. As the heat medium, for example, water, refrigerant such as HFO-1234yf, liquid such as coolant, and gas such as air may be adopted.

Figure 2:
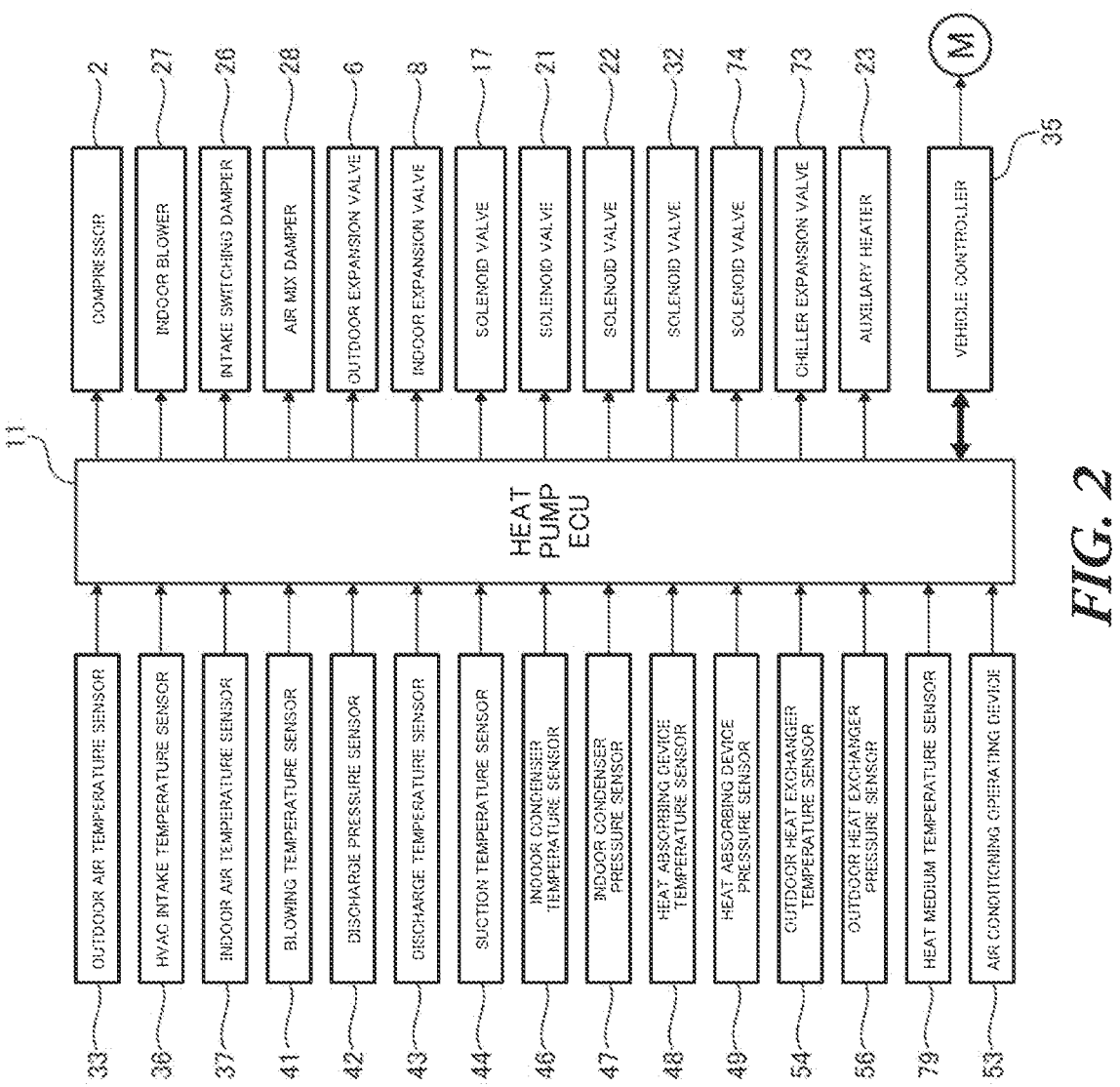
FIG. 2 is a block diagram illustrating a schematic configuration of a heat pump ECU as a controller of the vehicle air conditioning apparatus according to the embodiment of the invention.

FIG. 2 illustrates a schematic configuration of the heat pump ECU 11 as a controller of the vehicle air conditioning apparatus 1. The heat pump ECU 11 is connected to a vehicle controller 35 for the general control of the vehicle including the control of driving, via an in-vehicle network such as a CAN (controller area network) and a LIN (local interconnect network), and therefore can communicate with one another, and send and receive information. A microcomputer as an example of a computer with a processor is applicable to each of the heat pump ECU 11 and the vehicle controller 35.

Various sensors and detectors are connected to the heat pump ECU 11 as follows, and outputs of these sensors and detectors are inputted to the heat pump ECU 11. To be more specific, the heat pump ECU 11 is connected to an outdoor air temperature sensor 33 configured to detect outdoor air temperature Tam of the vehicle; an HVAC intake temperature sensor 36 configured to detect the temperature of the air taken from the intake port 25 into the air flow passage 3; an indoor air temperature sensor 37 configured to detect the temperature of the air in the vehicle compartment (indoor air temperature Tin); a blowing temperature sensor 41 configured to detect the temperature of the air blowing from a blowing outlet 29 to the vehicle compartment; a discharge pressure sensor 42 configured to detect the pressure of the refrigerant discharged from the compressor 2 (discharge pressure Pd); a discharge temperature sensor 43 configured to detect temperature Td of the refrigerant discharged from the compressor 2; a suction temperature sensor 44 configured to detect temperature Ts of the refrigerant sucked into the compressor 2; an indoor condenser temperature sensor 46 configured to detect the temperature of the indoor condenser 4 (the temperature of the refrigerant having passed through the indoor condenser 4, or the temperature of the indoor condenser 4 itself: indoor condenser temperature TCI); an indoor condenser pressure sensor 47 configured to detect the pressure of the indoor condenser 4 (the pressure of the refrigerant just after exiting from the indoor condenser 4: indoor condenser exit pressure Pci); a heat absorbing device temperature sensor 48 configured to detect the temperature of the heat absorbing device 9 (the temperature of the air having passed through the heat absorbing device 9, or the temperature of the heat absorbing device 9 itself: heat absorbing device temperature Te); a heat absorbing device pressure sensor 49 configured to detect the refrigerant pressure of the heat absorbing device 9 (the pressure of the refrigerant in the heat absorbing device 9, or the pressure of the refrigerant just after exiting from the heat absorbing device 9); an air conditioning operating device 53 configured to set the preset temperature and the switching of the air conditioning operation; an outdoor heat exchanger temperature sensor 54 configured to detect temperature of the outdoor heat exchanger 7 (temperature TXO of the refrigerant just after being discharged from the outdoor heat exchanger 7); and an outdoor heat exchanger pressure sensor 56 configured to detect the refrigerant pressure of the outdoor heat exchanger 7 (the pressure of the refrigerant just after being discharged from the outdoor heat exchanger 7: discharged refrigerant pressure PXO).

In addition to the above-described components, the heat pump ECU 11 is connected to a heat medium temperature sensor 79 configured to detect temperature Tw (hereinafter, referred to as "chiller water temperature") of the heat medium having exited from the heat medium flow path of the refrigerant-heat medium heat exchanger 64 and circulating through the heat medium circuit.

On the other hand, the output of the heat pump ECU 11 is connected to the compressor 2, the outdoor blower (not illustrated), the indoor blower (blower fan) 27, the intake switching damper 26, the air mix damper 28, the outdoor expansion valve 6, the indoor expansion valve 8, the solenoid valves 17, 21, 22, 35, and 74, the auxiliary heater 23, and the chiller expansion valve 73. The heat pump ECU 11 controls these components based on the output of each of the sensors, the setting inputted by the air conditioning operating device 53, and the information from the vehicle controller 35.

When the vehicle air conditioning apparatus 1 configured as described above performs the heating operation, the refrigerant evaporates in the outdoor heat exchanger 7 and absorbs the heat from the outdoor air to reduce the temperature of the outdoor heat exchanger 7, and therefore the moisture of the outdoor air becomes frost and adheres to the surface of the outdoor heat exchanger 7. Therefore, it is required to defrost the outdoor heat exchanger 7. In this case, the vehicle air conditioning apparatus 1 appropriately selects or switches between a plurality of defrosting operation modes depending on the situation of the vehicle to defrost the outdoor heat exchanger 7.

To be more specific, the vehicle air conditioning apparatus 1 according to the present embodiment appropriately selects between a hot gas defrosting mode to perform defrosting with so-called hot gas, and a heat absorption defrosting mode to absorb the heat into the refrigerant circulating through the refrigerant circuit R in the refrigerant-heat medium heat exchanger 64 or the heat absorbing device 9 and release the heat from the refrigerant in the outdoor heat exchanger 7.

The hot gas defrosting mode can almost evenly remove the frost and be easily controlled, but has low defrosting performance because it depends on only the compressor 2 to absorb the heat into the refrigerant. Accordingly, when the outdoor temperature is too low, it may not be possible to surely remove the frost.

On the other hand, in the heat absorption defrosting mode, the heat is absorbed into the refrigerant in the refrigerant-heat medium heat exchanger 64 or the heat absorbing device 9, and the refrigerant is compressed by the compressor 2 to increase the temperature and the pressure of the refrigerant to high levels. In addition, an auxiliary heat source can be used, and therefore the heat absorption defrosting mode has high defrosting performance and can be used even when the outdoor temperature is too low.

Consequently, the vehicle air conditioning apparatus 1 according to the present embodiment can rapidly, surely, and evenly remove the frost by selecting or switching between the heat absorption defrosting mode and the hot gas defrosting mode, based on preset conditions (described in detail later) depending on the situation of the vehicle.

<Hot Gas Defrosting Mode>

Figure 3:
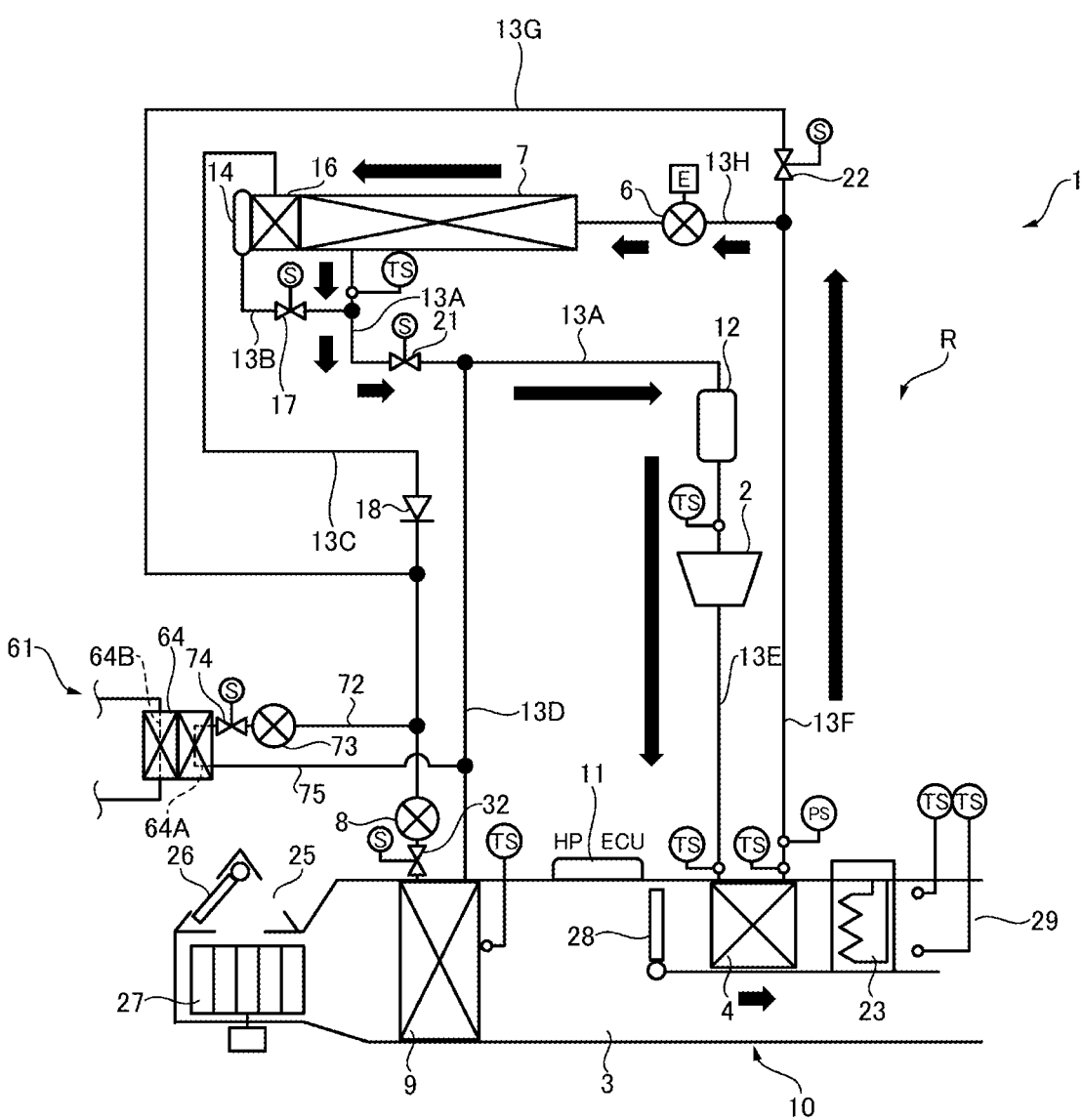
FIG. 3 illustrates the flow of refrigerant to defrost an outdoor heat exchanger in a hot gas defrosting mode of the vehicle air conditioning apparatus according to the embodiment of the invention.

FIG. 3 illustrates the flow of refrigerant in the refrigerant circuit R to defrost the outdoor heat exchanger 7 in the hot gas defrosting mode. In the hot gas defrosting mode, the heat pump ECU 11 fully opens the outdoor expansion valve 6 and actuates the compressor 2 to allow the refrigerant having a high temperature discharged from the compressor 2 to flow into the indoor condenser 4 while the refrigerant circuit R is set for the heating operation. Here, in the hot gas defrosting mode, the heat of the refrigerant is used for the defrosting, and therefore the refrigerant is hardly condensed in the indoor condenser 4 and merely passes through the indoor condenser 4.

The refrigerant having exited from the indoor condenser 4 passes through the refrigerant pipe 13F, reaches the refrigerant pipe 13H, passes through the outdoor expansion valve 6, and flows into the outdoor heat exchanger 7. The refrigerant with a high temperature having flowed into the outdoor heat exchanger 7 releases the heat in the outdoor heat exchanger 7, and melts the frost. The outdoor heat exchanger 7 is defrosted by the sensible heat and the latent heat of the refrigerant. Therefore, the hot gas defrosting mode can evenly defrost the outdoor heat exchanger 7. Here, during the defrosting, the outdoor blower is stopped, and, when a grille shutter is provided, it is closed. In addition, the blower fan 27 is not actuated, and the air mix damper 28 is closed.

<Heat Absorption Defrosting Mode>

The heat absorption defrosting mode includes, for example, a chiller defrosting mode to allow the refrigerant-heat medium heat exchanger 64 to function as a heat absorbing device, and a cooling cycle defrosting mode to use the heat absorbing device 9. Hereinafter, the chiller defrosting mode and the cooling cycle defrosting mode will be described.

(1) Chiller Defrosting

Figure 4:
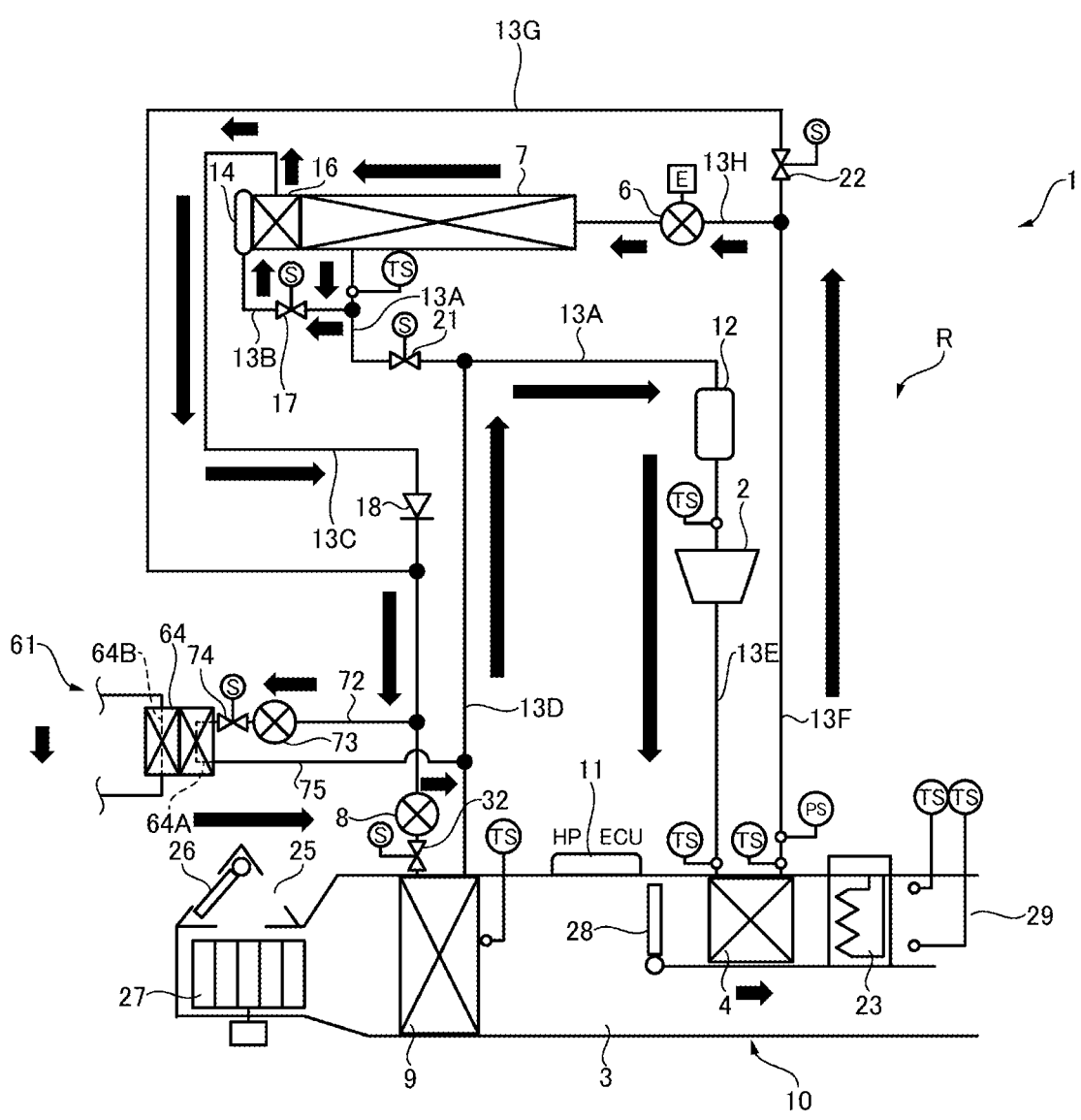
FIG. 4 illustrates the flow of refrigerant to defrost the outdoor heat exchanger in a chiller defrosting mode of the vehicle air conditioning apparatus according to the embodiment of the invention.

FIG. 4 illustrates the flow of refrigerant in the refrigerant circuit R to defrost the outdoor heat exchanger 7 in the chiller defrosting mode. In the chiller defrosting mode, the heat pump ECU 11 opens the solenoid valve 17 to allow the refrigerant having exited from the outdoor heat exchanger 7 to pass through the receiver dryer 14, the supercooling device 16, and the check valve 18, and flow into the refrigerant pipe 72. In addition, the heat pump ECU 11 opens the chiller expansion valve 73 and the solenoid valve 74 to allow the refrigerant to flow into the refrigerant flow path 64A of the refrigerant-heat medium heat exchanger 64. In the refrigerant flow path 64A, the refrigerant absorbs the heat from the heat medium having circulated through the heat medium circuit 61.

The heat pump ECU 11 closes at least one of the indoor expansion valve 8 and the solenoid valve 32 to allow the refrigerant having absorbed the heat to flow into the refrigerant pipes 13D and 13A via the refrigerant pipe 75, fully opens the outdoor expansion valve 6, actuates the compressor 2, and flows the refrigerant into the compressor 2. Then, the refrigerant compressed and discharged from the compressor 2, which has a high temperature and a high pressure, flows into the indoor condenser 4. Here, the heat of the refrigerant is used for the defrosting, and therefore the refrigerant is hardly condensed in the indoor condenser 4 and merely passes through the indoor condenser 4.

The refrigerant having exited from the indoor condenser 4 passes through the refrigerant pipe 13F, reaches the refrigerant pipe 13H, passes through the outdoor expansion valve 6, and flows into the outdoor heat exchanger 7. The refrigerant with a high temperature having flowed into the outdoor heat exchanger 7 releases the heat in the outdoor heat exchanger 7, and melts the frost. The outdoor heat exchanger 7 is defrosted by the latent heat of the refrigerant. Here, during the defrosting, the outdoor blower is stopped, and, when a grille shutter is provided, it is closed. In addition, the blower fan 27 is not actuated, and the air mix damper 28 is closed.

In the chiller defrosting mode, the defrosting performance depends on not only the performance of the compressor 2, but also the degree of heat absorption of the refrigerant in the refrigerant-heat medium heat exchanger 64. Incidentally, for example, an electric coolant heater (ECH) as an auxiliary heat source provided in the heat medium circuit 61 is appropriately actuated, and therefore it is possible to raise the temperature of the heat medium circulating through the heat medium circuit 61. Therefore, the electric coolant heater is supplementarily used to complement the amount of heat absorbed from the heat medium into the refrigerant, and consequently it is possible to complement the defrosting performance in the chiller defrosting mode.

(2) Cooling Cycle Defrosting

Figure 5:
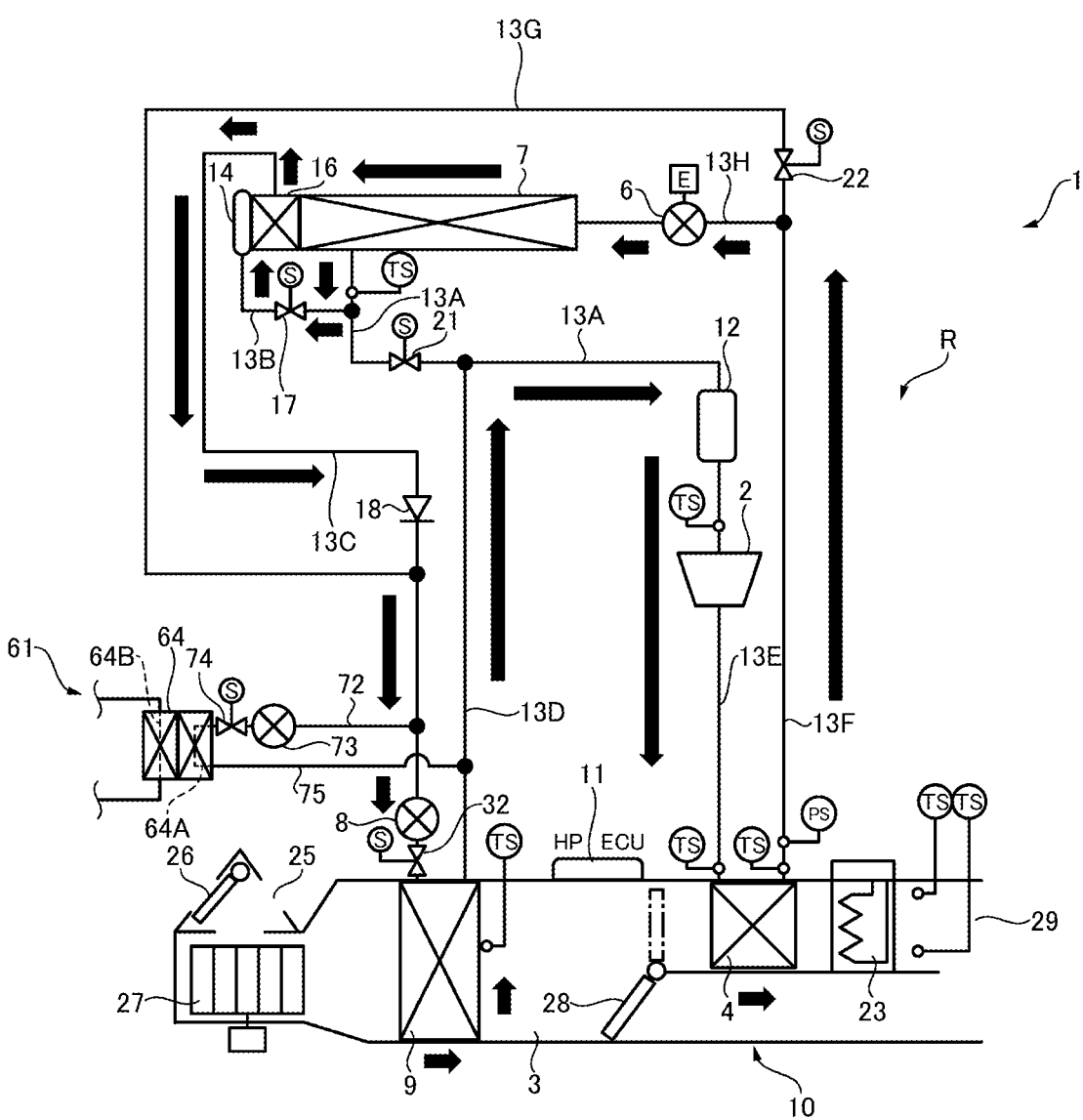
FIG. 5 illustrates the flow of refrigerant to defrost the outdoor heat exchanger in a cooling cycle defrosting mode of the vehicle air conditioning apparatus according to the embodiment of the invention.

FIG. 5 illustrates the flow of refrigerant in the refrigerant circuit R to defrost the outdoor heat exchanger 7 in the cooling cycle defrosting mode. In the cooling cycle defrosting mode, the heat pump ECU 11 opens the solenoid valve 17 to allow the refrigerant having exited from the outdoor heat exchanger 7 to pass through the receiver dryer 14, the supercooling device 16 and the check valve 18 and flow into the refrigerant pipe 72. In addition, the heat pump ECU 11 opens the indoor expansion valve 8 and the solenoid valve 32 to allow the refrigerant to flow into the heat absorbing device 9 and evaporate and absorb the heat in the heat absorbing device 9. In this case, the indoor blower 27 is actuated to allow the air blown out to ventilate the heat absorbing device 9.

The heat pump ECU 11 causes the refrigerant having evaporated and absorbed the heat in the heat absorbing device 9 to flow into the refrigerant pipes 13D and 13A, fully opens the outdoor expansion valve 6 and actuates the compressor 2 to allow the refrigerant to flow into the compressor 2. Then, the refrigerant compressed and discharged from the compressor 2, which has a high temperature and a high pressure, flows into the indoor condenser 4. Here, the heat of the refrigerant is used for the defrosting, and therefore the refrigerant is hardly condensed in the indoor condenser 4 and merely passes through the indoor condenser 4.

The refrigerant having exited from the indoor condenser 4 passes through the refrigerant pipe 13F, reaches the refrigerant pipe 13H, passes through the outdoor expansion valve 6, and flows into the outdoor heat exchanger 7. The refrigerant with a high temperature and a high pressure having flowed into the outdoor heat exchanger 7 releases the heat in the outdoor heat exchanger 7, and melts the frost. The outdoor heat exchanger 7 is defrosted by the latent heat of the refrigerant. Here, during the defrosting, the outdoor blower is stopped, and, when a grille shutter is provided, it is closed. In addition, only for the defrosting, the blower fan 27 is actuated, and the air mix damper 28 is closed.

In the cooling cycle defrosting mode, the defrosting performance depends on not only the performance of the compressor 2, but also the degree of heat absorption of the refrigerant in the heat absorbing device 9. Therefore, the auxiliary heater 23 such as an air heater (PTC heater) is appropriately actuated as an auxiliary heat source. In this case, the blower fan 27 is actuated, and the air mix damper 28 is opened. In this way, the air heated by the auxiliary heater 23 is circulated in the vehicle compartment to complement the heating of the vehicle compartment. By this means, it is possible to complement the amount of heat absorbed from the air in the vehicle compartment into the refrigerant in the heat absorbing device 9, and therefore to complement the defrosting performance in the cooling cycle defrosting mode.

Figure 6:
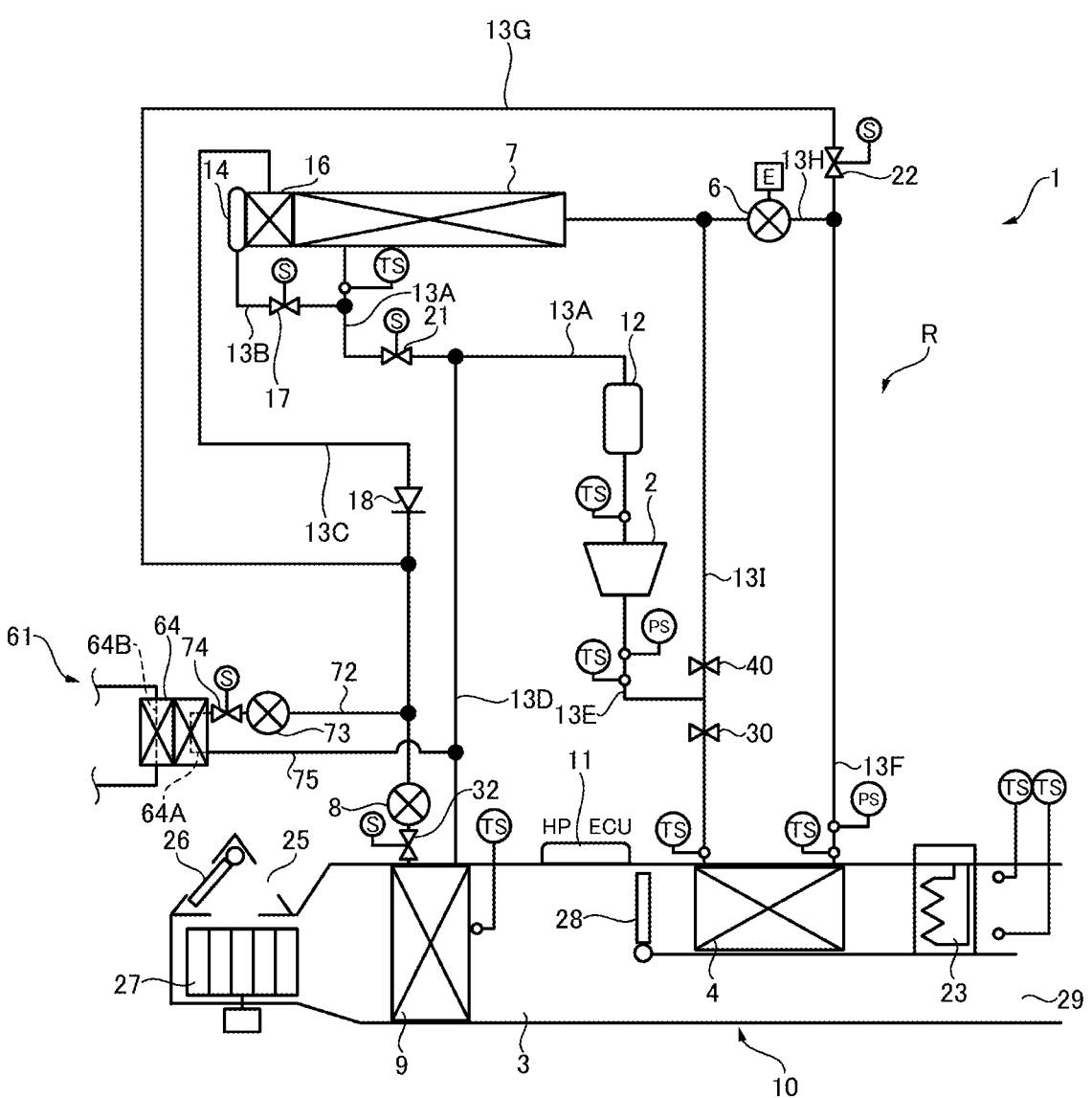
FIG. 6 illustrates another schematic configuration of the refrigerant circuit of the vehicle air conditioning apparatus according to the embodiment of the invention.

Here, as described above, both in the heat absorption defrosting mode and the hot gas defrosting mode, the heat of the refrigerant is used for the defrosting, and therefore there is no need to condense the refrigerant in the indoor condenser 4. Therefore, a refrigerant pipe to bypass the indoor condenser 4 may be provided in the refrigerant circuit. For example, as illustrated in FIG. 6, a refrigerant pipe 13I may be provided to allow the refrigerant discharged from the compressor 2 not to pass through the indoor condenser 4 but to flow into the refrigerant pipe 13H between the outdoor heat exchanger 7 and the outdoor expansion valve 6. In addition, a solenoid valve 40 and a solenoid valve 30 are provided upstream and downstream of the connection point of the refrigerant pipe 13I and the refrigerant pipe 13E with respect to the refrigerant flow, respectively.

Figure 7:
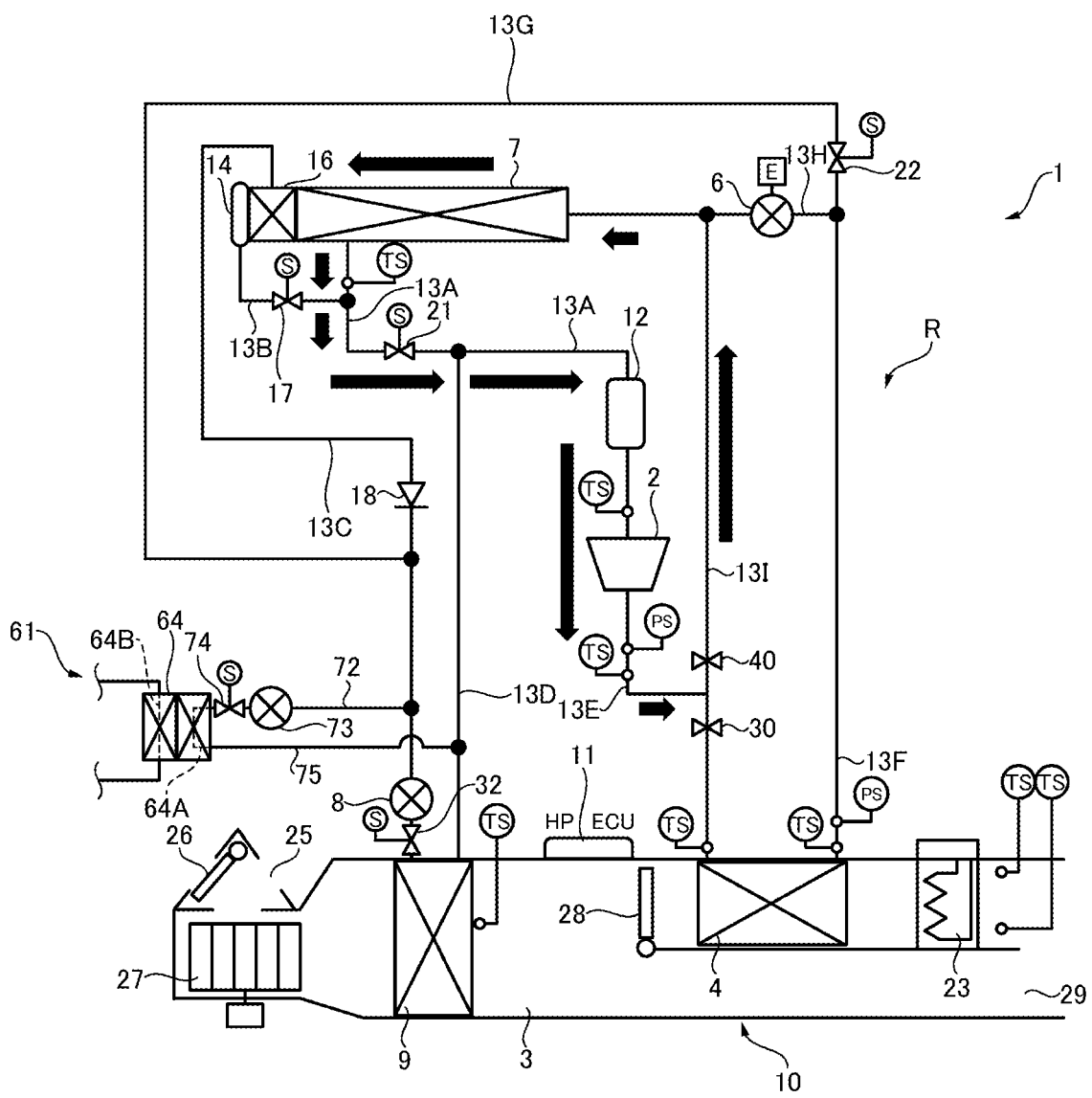
FIG. 7 illustrates the flow of refrigerant in another example of the refrigerant circuit to defrost the outdoor heat exchanger in a hot gas defrosting mode of the vehicle air conditioning apparatus according to the embodiment of the invention.
Figure 8:
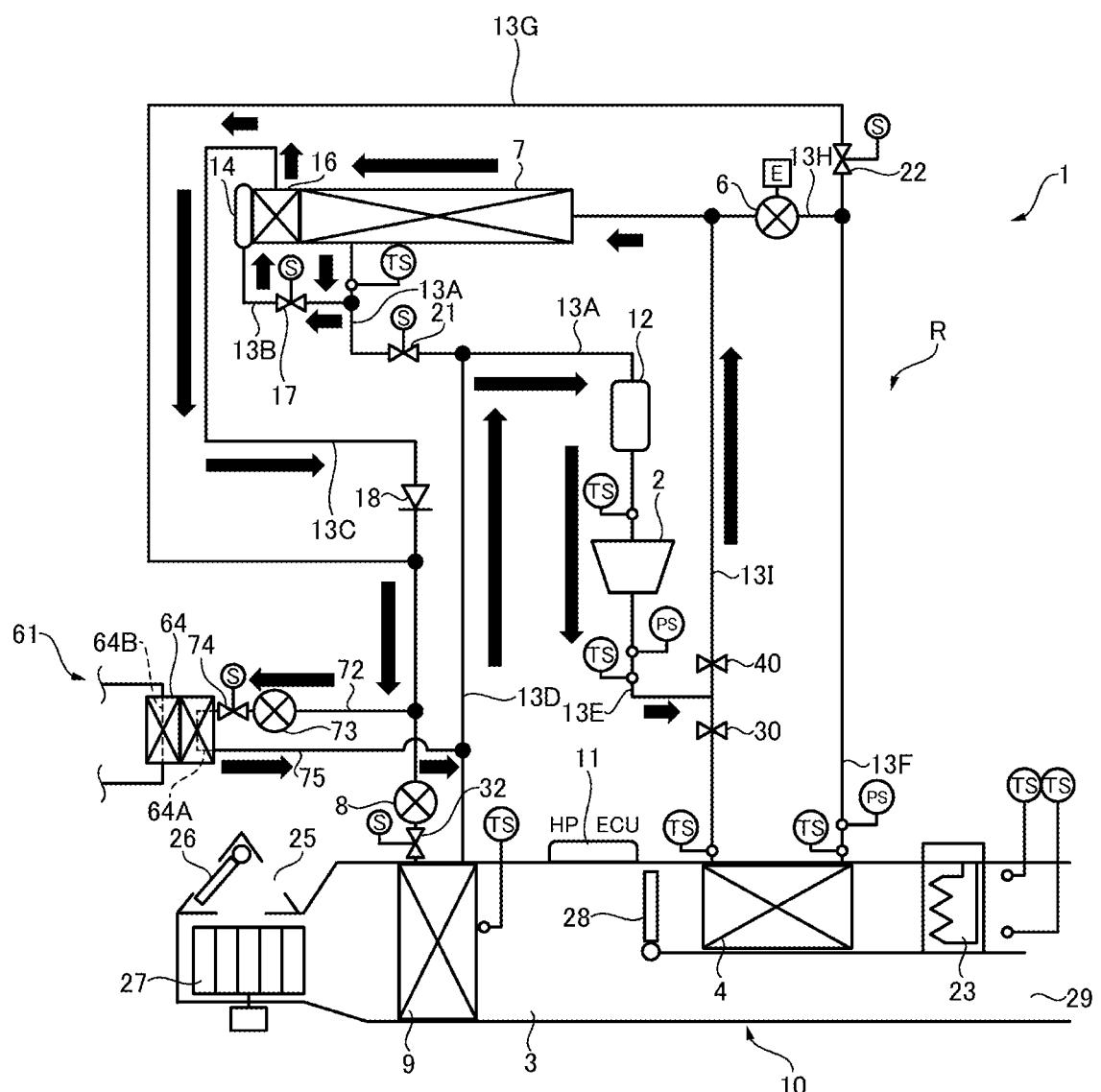
FIG. 8 illustrates the flow of refrigerant in another example of the refrigerant circuit to defrost the outdoor heat exchanger in a chiller defrosting mode of the vehicle air conditioning apparatus according to the embodiment of the invention.
Figure 9:
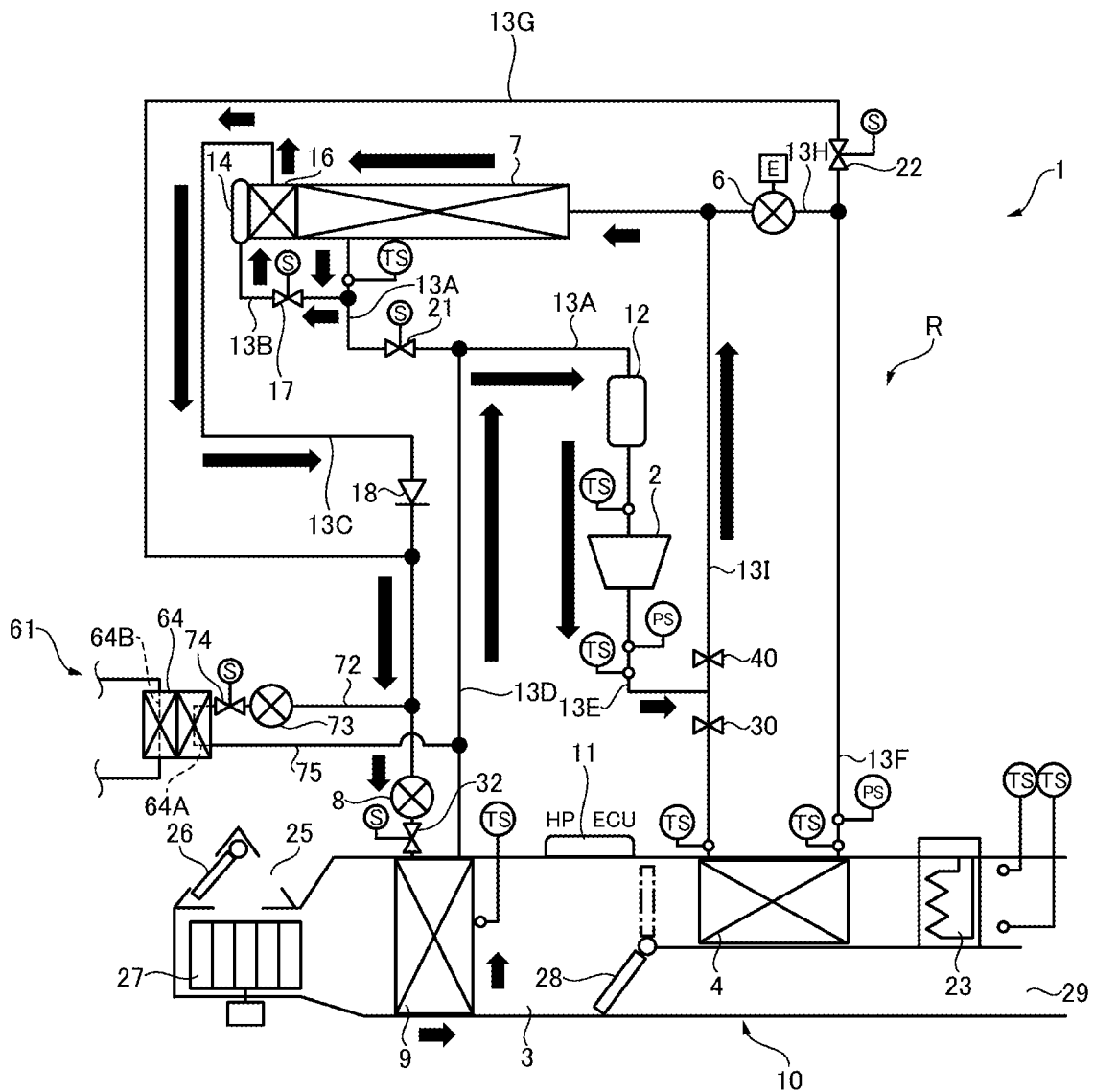
FIG. 9 illustrates the flow of refrigerant in another example of the refrigerant circuit to defrost the outdoor heat exchanger in a cooling cycle defrosting mode of the vehicle air conditioning apparatus according to the embodiment of the invention.

In this refrigerant circuit, the flow of refrigerant in the hot gas defrosting mode (FIG. 7), the flow of refrigerant in the chiller defrosting mode (FIG. 8), and the flow of refrigerant in the cooling cycle defrosting mode (FIG. 9) are as follows.

The refrigerant having a high temperature and a high pressure discharged from the compressor 2 flows into the refrigerant pipe 13E. The solenoid valve 30 is closed and the solenoid valve 40 is opened to allow the refrigerant to pass through the solenoid valve 40 and the refrigerant pipe 13I and flow into the outdoor heat exchanger 7. The refrigerant releases the heat in the outdoor heat exchanger 7 to melt the frost. In the hot gas defrosting mode illustrated in FIG. 7, the refrigerant having exited from the outdoor heat exchanger 7 passes through the solenoid valve 21 and is sucked into the compressor 2. In the chiller defrosting mode illustrated in FIG. 8, the refrigerant having exited from the outdoor heat exchanger 7 passes through the solenoid valve 17, the receiver dryer 14, the supercooling device 16, and the check valve 18, flows into the refrigerant pipe 72, passes through the chiller expansion valve 73 and the solenoid valve 74, absorbs the heat from the heat medium in the refrigerant flow path 64A of the refrigerant-heat medium heat exchanger 64, and is sucked into the compressor 2. In the cooling cycle defrosting mode illustrated in FIG. 9, the refrigerant having exited from the outdoor heat exchanger 7 passes through the solenoid valve 17, the receiver dryer 14, the supercooling device 16, and the check valve 18, flows into the heat absorbing device 9, and evaporates and absorbs the heat in the heat absorbing device 9, and is sucked into the compressor 2.

In the cooling cycle defrosting mode in particular, the air mix damper 28 needs to be opened to circulate the air heated by the auxiliary heater 23 through the vehicle compartment. When the air mix damper 28 is opened, the refrigerant passing through the indoor condenser 4 is subjected to a heat exchange with the air of the vehicle compartment in the indoor condenser 4, and therefore the defrosting performance is decreased. To address this, the indoor condenser 4 is bypassed to prevent the heat exchange between the air of the vehicle compartment and the refrigerant in the indoor condenser 4. By this means, it is possible to direct the refrigerant having a high temperature and a high pressure directly to the outdoor heat exchanger 7, and consequently to improve the defrosting performance.

<Setting Conditions of Selecting or Switching Between Defrosting Modes>

As described above, the selecting and the switching between the defrosting modes are performed based on the preset conditions. With the present embodiment, the heat pump ECU 11 presets conditions including: selecting conditions to select the defrosting mode to perform the defrosting when the defrosting needs to be started; switching conditions to switch the heat absorption defrosting mode to the hot gas defrosting mode; operation conditions to actuate the auxiliary heat source in the heat absorption defrosting mode; and defrosting end conditions to end the defrosting.

(1) Selecting Heat Absorption Defrosting Mode or Hot Gas Defrosting Mode

As described above, the defrosting performance of the heat absorption defrosting mode is high because the heat is absorbed into the refrigerant by the compressor 2, and also by the refrigerant-heat medium heat exchanger 64 or the heat absorbing device 9, and the auxiliary heat source can be used. Therefore, when rapid defrosting is desired, it is preferred that the heat absorption defrosting mode is preferentially performed. However, the defrosting only in the heat absorption defrosting mode may not fully melt the frost or not evenly remove the frost. Accordingly after the rapid defrosting is performed in the heat absorption defrosting mode, the hot gas defrosting mode is performed. By this means, even though the frost is not fully melted by the defrosting in the heat absorption defrosting mode, it is possible to surely and evenly remove the frost.

In addition, when the heat absorption defrosting mode is performed, it is possible to select the mode having higher defrosting performance from between the chiller defrosting mode and the cooling cycle defrosting mode, depending on the situation of the vehicle (the temperature of the heat medium passing through the refrigerant-heat medium heat exchanger 64, and the vehicle compartment temperature). In this way, the defrosting mode is selected, and appropriately switched and performed, and therefore it is possible to rapidly, surely and evenly remove the frost.

The selecting condition to select between the heat absorption defrosting mode and the hot gas defrosting mode is set by the temperature of each of the heat-absorbed subjects. To be more specific, for example, the selecting condition to select the chiller defrosting mode can be set by the chiller water temperature Tw (the temperature of the heat medium flowing through the refrigerant-heat medium heat exchanger 64). Meanwhile, the selecting condition to select the cooling cycle defrosting mode can be set by the vehicle compartment temperature Tin (the temperature of the heat medium (air) being subjected to a heat exchange with the refrigerant in the heat absorbing device 9).

When the selecting condition is satisfied, that is, when the chiller water temperature Tw is equal to or higher than predetermined temperature Twt1, the heat pump ECU 11 selects the chiller defrosting mode, and, when the vehicle compartment temperature Tin is equal to or higher than predetermined temperature Tint1, the heat pump ECU 11 selects the cooling cycle defrosting mode. Here, when the chiller water temperature Tw is equal to or higher than the predetermined temperature Twt1, and the vehicle compartment temperature Tin is equal to or higher than the predetermined temperature Tint1, the chiller defrosting mode is preferentially selected.

On the other hand, when the selecting condition is not satisfied, that is, when the chiller water temperature Tw is lower than the predetermined temperature Twt1, and the vehicle compartment temperature Tin is lower than the predetermined temperature Tint1, the heat pump ECU 11 determines the defrosting mode to be selected, based on predetermined temperature Tx set for the outdoor temperature Tam. That is, when the outdoor temperature Tam is equal to or higher than the predetermined temperature Tx, the hot gas defrosting mode is selected, and on the other hand, when the outdoor temperature Tam is lower than the predetermined temperature Tx, the heat absorption defrosting mode (the chiller defrosting mode) is selected. In this case, when the chiller defrosting mode is performed, the chiller water temperature Tw is lower than the predetermined temperature Twt1, and therefore the defrosting performance is not sufficient in this state. To address this, the heat pump ECU 11 actuates the electric coolant heater (ECH) as an auxiliary heat source to complement the defrosting performance.

(2) Switching Heat Absorption Defrosting Mode to Hot Gas Defrosting Mode

When the chiller defrosting mode or the cooling cycle defrosting mode is switched to the hot gas defrosting mode, for example, threshold temperature Trt1 for the refrigerant temperature, or threshold pressure Prt1 for the refrigerant pressure is set as a switching condition. For example, the threshold temperature Trt1 is set to 5 degrees Celsius, and the threshold pressure Prt1 is set to 0.25 MPaG, which are a temperature and a pressure at which it is conceivable that the defrosting in the chiller defrosting mode or the cooling cycle defrosting mode has substantially progressed.

After starting the defrosting in the chiller defrosting mode or the cooling cycle defrosting mode, when the refrigerant temperature or the refrigerant pressure is equal to or higher the preset threshold (the threshold temperature Trt1 or the threshold pressure Prt1), the heat pump ECU 11 switches the chiller defrosting mode or the cooling cycle defrosting mode to the hot gas defrosting mode. In addition, as a switching condition, it is possible to set predetermined period of time TP1 (e.g. 15 minutes) from starting the chiller defrosting mode or the cooling cycle defrosting mode.

As the refrigerant temperature, for example, the temperature Ts of the refrigerant sucked into the compressor 2, the temperature Td of the refrigerant discharged from the compressor 2, and the temperature TXO of the refrigerant just after being discharged from the outdoor heat exchanger 7 are detected and used. As the refrigerant pressure, for example, pressure Ps of the refrigerant sucked into the compressor 2, the pressure Pd of the refrigerant discharged from the compressor 2, and the pressure PXO of the refrigerant just after being discharged from the outdoor heat exchanger 7 are detected and used.

(3) Operation of Auxiliary Heat Source During Defrosting in Heat Absorption Defrosting Mode The heat pump ECU 11 also sets operation conditions to determine whether the auxiliary heat source is actuated during the defrosting in the heat absorption defrosting mode.

In the chiller defrosting mode, when the chiller water temperature Tw (the temperature of the heat medium) is lower than temperature Twt2 set as an operation condition, the electric coolant heater (ECH) as an auxiliary heat source is actuated. Meanwhile, when the chiller water temperature Tw is higher than temperature Twt3 set as an operation stop condition, the electric coolant heater may be stopped. Here, the temperature Twt2 set as the operation condition may be equal to the predetermined temperature Twt1 defined as the selecting condition.

In the cooling cycle defrosting mode, when the vehicle compartment temperature Tin is lower than temperature Tint2 set as an operation condition, the auxiliary heater 23 as an auxiliary heat source is actuated. Meanwhile, when the vehicle compartment temperature Tin is higher than temperature Tint3 set as an operation stop condition, the auxiliary heater 23 may be stopped. The temperature Tint2 set as the operation condition may be equal to the predetermined temperature Tint1 defined as the selecting condition.

(4) End of Defrosting

With the present embodiment, as the defrosting end condition to end the defrosting, threshold Trt2 for the refrigerant temperature, or threshold Prt2 for the refrigerant pressure is set. When predetermined period of time TP2 for which the temperature or the pressure of the refrigerant is higher than the preset threshold (the threshold temperature Trt2 or the threshold pressure Prt2) has elapsed, the heat pump ECU 11 ends the defrosting mode.

<Process of Selecting and Switching Between Defrosting Modes>

Figure 10:
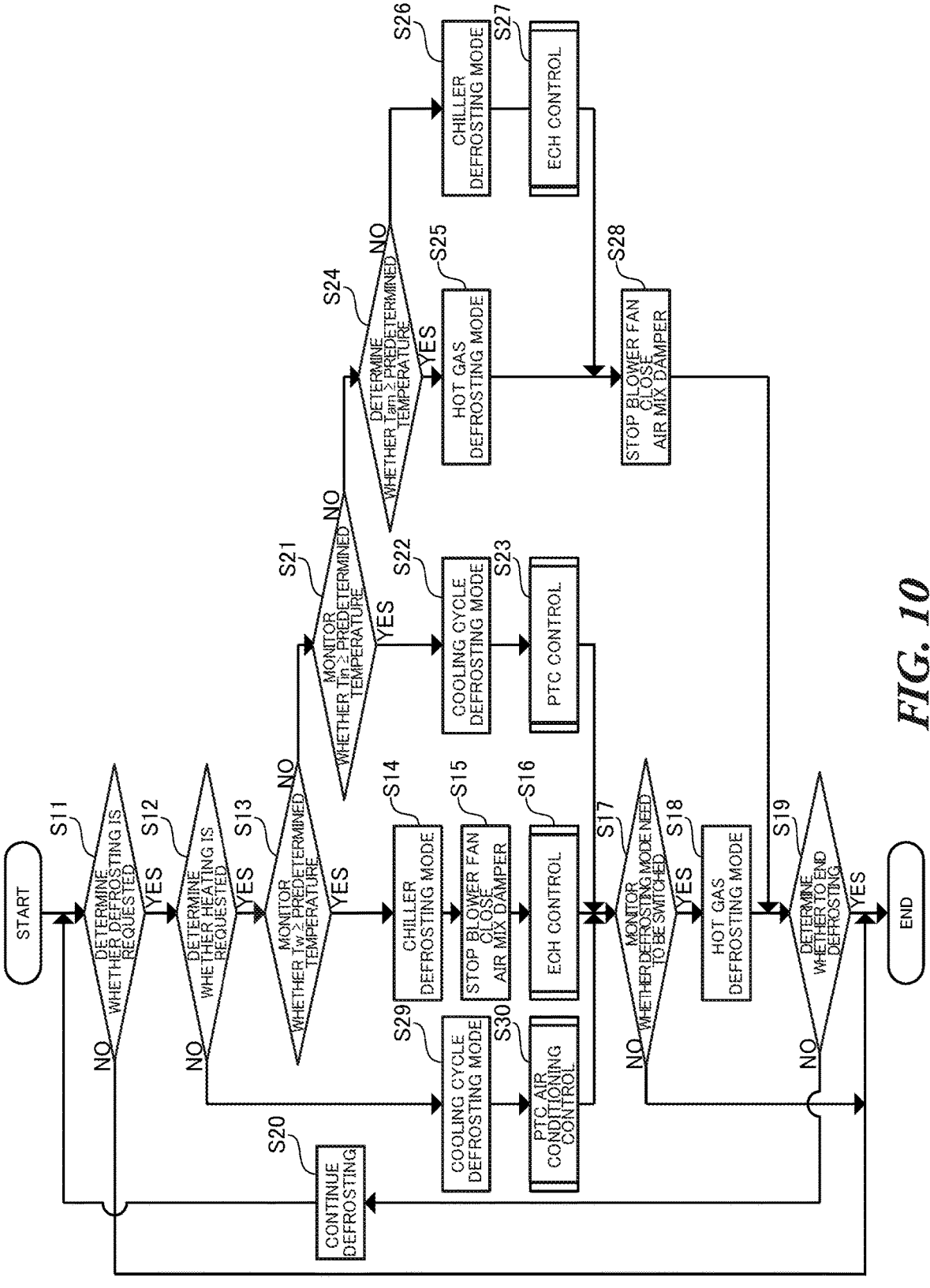
FIG. 10 is a flowchart illustrating a process of selecting and switching defrosting modes of the vehicle air conditioning apparatus according to the embodiment of the invention.

Hereinafter, selecting and switching between the defrosting modes of the vehicle air conditioning apparatus according to the present embodiment will be described with reference to the flowchart illustrated in FIG. 10.

When the defrosting operation is automatically selected or selected by manually operating the air conditioning operating device 53, the heat pump ECU 11 determines that the defrosting is requested (step S11), and determines whether the heating is also requested (step S12). When determining that the heating is not requested, the heat pump ECU 11 monitors whether the chiller water temperature Tw is equal to or higher than the predetermined temperature Twt1 (step S13).

When determining that the chiller water temperature Tw is equal to or higher than the predetermined temperature Twt1, the heat pump ECU 11 selects and performs the chiller defrosting mode (step S14). When selecting the chiller defrosting mode, the heat pump ECU 11 stops the blower fan 27 and closes the air mix damper 28 (step S15), and then controls the electric coolant heater as an auxiliary heat source (ECH control) (step S16). The ECH control will be described later. After that, the heat pump ECU 11 monitors whether the defrosting mode needs to be switched (step S17).

Determination of whether the defrosting mode needs to be switched is as follows. After starting defrosting the outdoor heat exchanger 7 in the chiller defrosting mode in the step S14, the heat pump ECU 11 obtains the refrigerant temperature (Ts, Td, or TXO) from one of the suction temperature sensor 44, the discharge temperature sensor 43, and the outdoor heat exchanger temperature sensor 54, and switches the chiller defrosting mode to the hot gas defrosting mode (step S17 and step S18) when the refrigerant temperature Tr is equal to or higher than the preset threshold temperature Trt1.

In the step S17, the refrigerant pressure (Ps, Pd, or PXO) may be obtained from the discharge pressure sensor 42, or the outdoor heat exchanger pressure sensor 56, instead of the refrigerant temperature, and when the refrigerant pressure is equal to or higher than the preset threshold temperature Prt1 (step S17), the chiller defrosting mode may be switched to the hot gas defrosting mode (step S17 and step S18). Alternatively, the heat pump ECU 11 may switch the chiller defrosting mode to the hot gas defrosting mode after the predetermined period of time TP1 has elapsed from the start of defrosting the outdoor heat exchanger 7 in the chiller defrosting mode in the step S14 (the step S17 and the step S18). When determining that the defrosting mode does not need to be switched in the step S17, the heat pump ECU 11 ends the defrosting.

When the hot gas defrosting mode is selected and performed (the step S18), the heat pump ECU 11 determines whether to end the defrosting (step S19). To be more specific, the heat pump ECU 11 ends the defrosting when the state in which the refrigerant temperature is equal to or higher than the preset threshold temperature Trt2, or the state in which the refrigerant pressure is equal to or higher than the preset threshold pressure Prt2 continues for the predetermined period of time TP2 (the step S19). When the condition to end the defrosting is not satisfied, the heat pump ECU 11 moves the step back to the step S11 and repeats the above-described process while continuing the defrosting (step S20).

On the other hand, when determining that the chiller water temperature Tw is lower than the predetermined temperature Twt1 in the step S13, the heat pump ECU 11 monitors the vehicle compartment temperature Tin (step S21). When determining that the vehicle compartment temperature Tin is equal to or higher than the predetermined temperature Tint1, the heat pump ECU 11 selects and performs the cooling cycle defrosting mode (step S22). When selecting the cooling cycle defrosting mode, the heat pump ECU 11 controls the auxiliary heater 23 (PTC control) (step S23). The PTC control will be described later.

After that, the heat pump ECU 11 performs the step S17 to the step S19 described above. That is, the heat pump ECU 11 monitors whether the defrosting mode needs to be switched (the step S17), and when determining that the defrosting mode does not need to be switched, the heat pump ECU 11 ends the defrosting. On the other hand, when determining that the defrosting mode needs to be switched, the heat pump ECU 11 switches the defrosting mode and performs the hot gas defrosting mode (the step S18). After performing the hot gas defrosting mode, the heat pump ECU 11 determines whether to end the defrosting (step S19), and when a predetermined defrosting end condition is satisfied, the heat pump ECU 11 ends the defrosting.

In step S21 of monitoring the vehicle compartment temperature Tin, when the vehicle compartment temperature Tin is lower than the predetermined temperature Tint1, the heat pump ECU 11 obtains the outdoor temperature Tam detected by the outdoor temperature sensor 33. The heat pump ECU 11 compares the outdoor temperature Tam with the predetermined temperature Tx (step S24).

When determining that the outdoor temperature Tam is equal to or higher than the predetermined temperature Tx in the step S24822, the heat pump ECU 11 selects the hot gas defrosting mode (step S25). On the other hand, when the outdoor temperature Tam is lower than the predetermined temperature Tx, the heat pump ECU 11 selects the chiller defrosting mode as the heat absorption defrosting mode (step S26).

When the chiller defrosting mode is selected, the ECH control is performed (step S27). Both in the case where the hot gas defrosting mode is selected (the step S25), and in the case where the chiller defrosting mode is selected (the step S26), the blower fan 27 is stopped and the air mix damper 28 is closed (step S28) to perform the defrosting. After that, the heat pump ECU 11 determines whether to end the defrosting, and when the predetermined defrosting end condition is satisfied, the heat pump ECU 11 ends the defrosting.

When determining that the heating is requested in the step S12, the heat pump ECU 11 selects and performs the cooling cycle defrosting mode (step S29). When the cooling cycle defrosting mode is selected, the air conditioning control is performed with use of the auxiliary heater (PTC air conditioning control) (step S30). The PTC air conditioning control will be described later.

After that, the heat pump ECU 11 performs the step S17 to step S19 described above. That is, the heat pump ECU 11 monitors whether the defrosting mode needs to be switched (the step S17), and when determining that the defrosting mode does not need to be switched, the heat pump ECU 11 ends the defrosting. On the other hand, when determining that the defrosting mode needs to be switched, the heat pump ECU 11 switches the defrosting mode and performs the hot gas defrosting mode (the step S18). After performing the hot gas defrosting mode, the heat pump ECU 11 determines whether to end the defrosting (the step S19), and when the predetermined defrosting end condition is satisfied, the heat pump ECU 11 ends the defrosting.

<Process of Actuating Auxiliary Heat Source>

Hereinafter, with reference to the flowcharts illustrated in FIGS. 11A-11C, control processes (the ECH control, the PTC control, and the PTC air conditioning control) of actuating the auxiliary heat source during the heat absorption defrosting mode of the vehicle air conditioning apparatus according to the present embodiment will be described.

During the heat absorption defrosting mode, the heat pump ECU 11 complements the defrosting performance as needed. Therefore, when the chiller defrosting mode is being performed, the heat pump ECU 11 controls the electric coolant heater according to the flowchart of the ECH control illustrated in FIG. 11A. To be more specific, the heat pump ECU 11 compares the chiller water temperature Tw with the predetermined temperature Twt2 (step S311), and when determining that the chiller water temperature Tw is equal to or higher than the predetermined temperature Twt2, the heat pump ECU 11 does not actuate the electric coolant heater (step S312). On the other hand, when determining that the chiller water temperature Tw is lower than the predetermined temperature Twt2, the heat pump ECU 11 actuates the electric coolant heater (step S313).

When the cooling cycle defrosting mode is being performed, the heat pump ECU 11 controls the auxiliary heater 23 according to the flowchart of the PTC control illustrated in FIG. 11. To be more specific, the heat pump ECU 11 compares the vehicle compartment temperature Tin with the predetermined temperature Tint2 (step S321), and when determining that the vehicle compartment temperature Tin is equal to or higher than the predetermined temperature Tint2, the heat pump ECU 11 does not actuate the auxiliary heater (step S322), actuates the blower fan, and closes the air mix damper 28 (S323). On the other hand, when determining that the vehicle compartment temperature Tin is lower than the predetermined temperature Tint1, the heat pump ECU 11 actuates the auxiliary heater (S324), actuates the blower fan, and opens the air mix damper 28 (step S325).

Figures 11A, 11B, 11C:
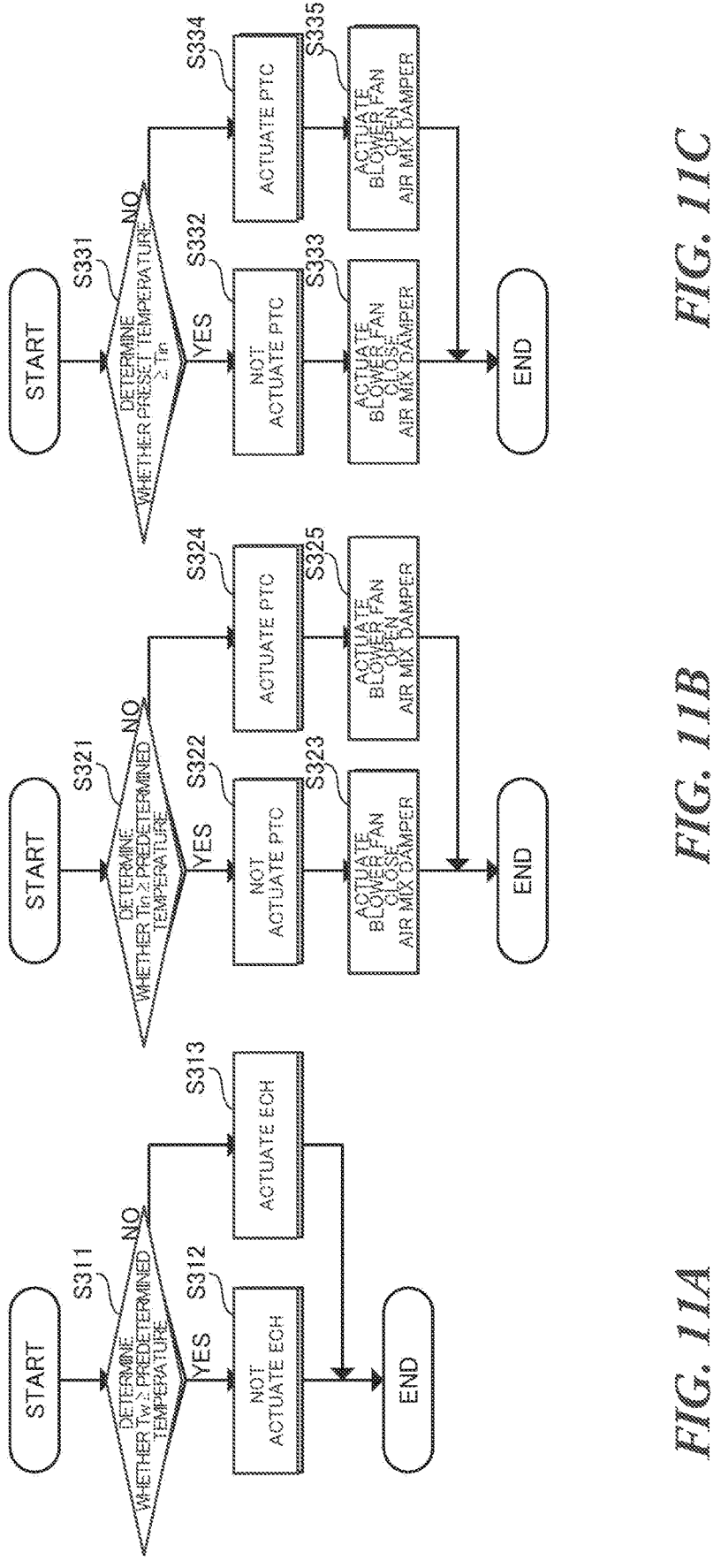
FIGS. 11A-11C are flowcharts illustrating a process of controlling the operation of an auxiliary heat source during a heat absorption defrosting mode in the vehicle air conditioning apparatus according to the embodiment of the invention.

When the heating is requested, and the cooling cycle defrosting mode is being performed, the heat pump ECU 11 controls the auxiliary heater 23 according to the flowchart of the PTC air conditioning control illustrated in FIG. 11C. To be more specific, the heat pump ECU 11 compares the vehicle compartment temperature Tin with preset temperature Tset set by a user (step S331), and when determining that the vehicle compartment temperature Tin is equal to or higher than the preset temperature Tset, the heat pump ECU 11 does not actuate the auxiliary heater (step S332), actuates the blower fan, and closes the air mix damper 28 (S333). On the other hand, when determining that the vehicle compartment temperature Tin is lower than the preset temperature Tset, the heat pump ECU 11 actuates the auxiliary heater (step S334), actuates the blower fan, and opens the air mix damper 28 (step S335).

Here, operation stop conditions may be set for the electric coolant heater and the auxiliary heater.

When the heating is requested, and the cooling cycle defrosting mode is being performed, the heat pump ECU 11 controls the auxiliary heater 23 according to the flowchart of the PTC air conditioning control illustrated in FIG. 11(C). To be more specific, the heat pump ECU 11 compares the vehicle compartment temperature Tin with preset temperature Tset set by a user (step S331), and when determining that the vehicle compartment temperature Tin is higher than the preset temperature Tset, the heat pump ECU 11 does not actuate the auxiliary heater (step S332), actuates the blower fan, and closes the air mix damper 28 (S333). On the other hand, when determining that the vehicle compartment temperature Tin is lower than the preset temperature Tset, the heat pump ECU 11 actuates the auxiliary heater (step S334), actuates the blower fan, and opens the air mix damper 28 (step S335).

Here, operation stop conditions may be set for the electric coolant heater and the auxiliary heater.

As described above, in the vehicle air conditioning apparatus 1 according to the present embodiment, the heat pump ECU 11 can perform the plurality of defrosting modes including the heat absorption defrosting mode (the chiller defrosting mode or the cooling cycle defrosting mode) and the hot gas defrosting mode. The heat pump ECU 11 performs the defrosting by preferentially performing the heat absorption defrosting mode according to the predetermined selecting condition, and switching the heat absorption defrosting mode to the hot gas defrosting mode depending on the proceeding of the defrosting. By this means, it is possible to rapidly perform the defrosting in the heat absorption defrosting mode, and solve uneven defrosting such as unmelted frost in the hot gas defrosting mode, and consequently to rapidly and evenly remove the frost.

As described above, the embodiments of the present invention have been described in detail with reference to the drawings. However, the specific configuration is not limited to these embodiments, and the design can be changed without departing from the scope of the present invention.

REFERENCE SIGNS LIST

1: vehicle air conditioning apparatus, 2: compressor, 3: air flow passage, 4: indoor condenser, 6: outdoor expansion valve, 7: outdoor heat exchanger, 8: indoor expansion valve, 9: heat absorbing device, 11: heat pump ECU (controller), 23: auxiliary heater, 27: blower fan 28: air mix damper 64: refrigerant-heat medium heat exchanger, 73: chiller expansion valve

The invention claimed is:

1. A vehicle air conditioning apparatus comprising:
a refrigerant circuit including:
    a compressor configured to compress refrigerant;
    an outdoor heat exchanger configured to perform a heat exchange between the refrigerant and outdoor air; and
    a heat absorption heat exchanger configured to absorb heat from a heat-absorbed subject into the refrigerant; and
a controller configured to control the refrigerant circuit,
    the controller comprising a heat pump ECU, inputs of the heat pump ECU being connected to:
        an HVAC intake temperature sensor configured to detect a temperature of an air taken from an intake port into an air flow passage;
        an indoor air temperature sensor configured to detect an indoor air temperature Tin that is a temperature of an air in a vehicle compartment;
        a blowing temperature sensor configured to detect a temperature of an air blowing from a blowing outlet to the vehicle compartment;
        a discharge pressure sensor configured to detect a discharge pressure Pd that is a pressure of a refrigerant discharged from the compressor;
        a discharge temperature sensor configured to detect temperature Td of the refrigerant discharged from the compressor;
        a suction temperature sensor configured to detect temperature Ts of the refrigerant sucked into the compressor;
        an indoor condenser temperature sensor configured to detect an indoor condenser temperature TCI that is a temperature of the refrigerant passed through the indoor condenser or a temperature of the indoor condenser;
        an indoor condenser pressure sensor configured to detect an indoor condenser exit pressure Pci that is a pressure of the refrigerant just after exiting from the indoor condenser;
        a heat absorbing device temperature sensor configured to detect a heat absorbing device temperature Te that is a temperature of an air passed through a heat absorbing device or a temperature of the heat absorbing device itself;
        a heat absorbing device pressure sensor configured to detect a pressure of the refrigerant in the heat absorbing device or a pressure of the refrigerant just after exiting from the heat absorbing device;

an air conditioning operating device configured to set a preset temperature and switching of an air conditioning operation;
        an outdoor heat exchanger temperature sensor configured to detect a temperature TXO of the refrigerant just after being discharged from the outdoor heat exchanger;
        an outdoor heat exchanger pressure sensor configured to detect a discharged refrigerant pressure PXO that is a pressure of the refrigerant just after being discharged from the outdoor heat exchanger; and
        a heat medium temperature sensor configured to detect temperature Tw that is a chiller water temperature of a heat medium exited from a heat medium flow path of a refrigerant-heat medium heat exchanger and circulating through a heat medium circuit, and
    outputs of the heat pump ECU being connected to:
        the compressor;
        an outdoor blower;
        an indoor blower;
        an intake switching damper;
        an air mix damper;
        an outdoor expansion valve;
        the indoor expansion valve;
        one or more of solenoid valves;
        an auxiliary heater; and
        a chiller expansion valve,
wherein the controller can selectively perform a plurality of defrosting modes including:
    a hot gas defrosting mode to defrost the outdoor heat exchanger by the refrigerant compressed by the compressor; and
    a heat absorption defrosting mode to defrost the outdoor heat exchanger by the refrigerant absorbing the heat from the heat-absorbed subject and compressed by the compressor, and
the controller sets a selecting condition to preferentially select the heat absorption defrosting mode, and a switching condition to switch the heat absorption defrosting mode to the hot gas defrosting mode and performs the hot gas defrosting mode,
wherein the heat absorption defrosting mode includes at least one of:
a chiller defrosting mode in which the heat absorption heat exchanger is the refrigerant-heat medium heat exchanger configured to perform a heat exchange between heat medium circulating through the heat medium circuit and the refrigerant; and
a cooling cycle defrosting mode in which the heat absorption heat exchanger is the heat absorbing device configured to absorb heat into the refrigerant from air supplied to the vehicle compartment,
and wherein the controller:
sets the selecting condition based on the vehicle compartment temperature,
selects the cooling cycle defrosting mode when the vehicle compartment temperature is equal to or higher than a predetermined temperature Tint1, and
selects the chiller defrosting mode when the temperature Tw of the heat medium flowing through the refrigerant-heat medium heat exchanger is equal to or higher than a predetermined temperature Twt1 and the vehicle compartment temperature is equal to or higher than the predetermined temperature Tint1.

2. The vehicle air conditioning apparatus according to claim 1, wherein:

the controller is configured to:

set the switching condition based on one of the refrigerant pressure, the refrigerant temperature, and a period of time for which the heat absorption defrosting mode is performed; and switch from the heat absorption defrosting mode to the hot gas defrosting mode when one of the refrigerant pressure, the refrigerant temperature, and the period of time satisfies the set switching condition.

3. The vehicle air conditioning apparatus according to claim 1, wherein one of a state in which the refrigerant temperature is equal to or higher than a preset threshold temperature Trt3, and a state in which the refrigerant pressure is equal to or higher than a preset threshold pressure Prt3 continues for a predetermined period of time TP2, the controller ends a defrosting mode.

4. A vehicle air conditioning apparatus comprising:

a refrigerant circuit including:

a compressor configured to compress refrigerant;

an outdoor heat exchanger configured to perform a heat exchange between the refrigerant and outdoor air; and a heat absorption heat exchanger configured to absorb heat from a heat-absorbed subject into the refrigerant; and a controller configured to control the refrigerant circuit, the controller comprising a heat pump ECU, inputs of the heat pump ECU being connected to:

an HVAC intake temperature sensor configured to detect a temperature of an air taken from an intake port into an air flow passage;

an indoor air temperature sensor configured to detect an indoor air temperature Tin that is a temperature of an air in a vehicle compartment;

a blowing temperature sensor configured to detect a temperature of an air blowing from a blowing outlet to the vehicle compartment;

a discharge pressure sensor configured to detect a discharge pressure Pd that is a pressure of a refrigerant discharged from the compressor;

a discharge temperature sensor configured to detect temperature Td of the refrigerant discharged from the compressor;

a suction temperature sensor configured to detect temperature Ts of the refrigerant sucked into the compressor;

an indoor condenser temperature sensor configured to detect an indoor condenser temperature TCI that is a temperature of the refrigerant passed through the indoor condenser or a temperature of the indoor condenser;

an indoor condenser pressure sensor configured to detect an indoor condenser exit pressure Pci that is a pressure of the refrigerant just after exiting from the indoor condenser;

a heat absorbing device temperature sensor configured to detect a heat absorbing device temperature Te that is a temperature of an air passed through a heat absorbing device or a temperature of the heat absorbing device itself;

a heat absorbing device pressure sensor configured to detect a pressure of the refrigerant in the heat absorbing device or a pressure of the refrigerant just after exiting from the heat absorbing device;

an air conditioning operating device configured to set a preset temperature and switching of an air conditioning operation;

an outdoor heat exchanger temperature sensor configured to detect a temperature TXO of the refrigerant just after being discharged from the outdoor heat exchanger;

an outdoor heat exchanger pressure sensor configured to detect a discharged refrigerant pressure PXO that is a pressure of the refrigerant just after being discharged from the outdoor heat exchanger; and a heat medium temperature sensor configured to detect temperature Tw that is a chiller water temperature of a heat medium exited from a heat medium flow path of a refrigerant-heat medium heat exchanger and circulating through a heat medium circuit, and outputs of the heat pump ECU being connected to:

the compressor;

an outdoor blower;

an indoor blower;

an intake switching damper;

an air mix damper;

an outdoor expansion valve;

the indoor expansion valve;

one or more of solenoid valves;

an auxiliary heater; and a chiller expansion valve, wherein the controller can selectively perform a plurality of defrosting modes including:

a hot gas defrosting mode to defrost the outdoor heat exchanger by the refrigerant compressed by the compressor; and a heat absorption defrosting mode to defrost the outdoor heat exchanger by the refrigerant absorbing the heat from the heat-absorbed subject and compressed by the compressor, and the controller sets a selecting condition to preferentially select the heat absorption defrosting mode, and a switching condition to switch the heat absorption defrosting mode to the hot gas defrosting mode and performs the hot gas defrosting mode, wherein the heat absorption defrosting mode includes at least one of:

a chiller defrosting mode in which the heat absorption heat exchanger is the refrigerant-heat medium heat exchanger configured to perform a heat exchange between heat medium circulating through the heat medium circuit and the refrigerant; and a cooling cycle defrosting mode in which the heat absorption heat exchanger is the heat absorbing device configured to absorb heat into the refrigerant from air supplied to the vehicle compartment, and wherein the controller:

sets the selecting condition based on the vehicle compartment temperature, selects the cooling cycle defrosting mode when the vehicle compartment temperature is equal to or higher than a predetermined temperature Tint1, and selects the hot gas defrosting mode when the temperature Tw of the heat medium flowing through the refrigerant-heat medium heat exchanger is lower than a predetermined temperature Twt1, the vehicle compartment temperature is lower than the predetermined temperature Tint1, and an outdoor temperature is equal to or higher than a predetermined temperature Tx.

5. The vehicle air conditioning apparatus according to claim 4, wherein the controller is configured to:

set the switching condition based on one of the refrigerant pressure, the refrigerant temperature, and a period of time for which the heat absorption defrosting mode is performed; and switch from the heat absorption defrosting mode to the hot gas defrosting mode when one of the refrigerant pressure, the refrigerant temperature, and the period of time satisfies the set switching condition.

6. The vehicle air conditioning apparatus according to claim 4, wherein one of a state in which the refrigerant temperature is equal to or higher than a preset threshold temperature Trt3, and a state in which the refrigerant pressure is equal to or higher than a preset threshold pressure Prt3 continues for a predetermined period of time TP2, the controller ends a defrosting mode.

7. A vehicle air conditioning apparatus comprising:

a refrigerant circuit including:

a compressor configured to compress refrigerant;

an outdoor heat exchanger configured to perform a heat exchange between the refrigerant and outdoor air; and a heat absorption heat exchanger configured to absorb heat from a heat-absorbed subject into the refrigerant; and a controller configured to control the refrigerant circuit, the controller comprising a heat pump ECU, inputs of the heat pump ECU being connected to:

an HVAC intake temperature sensor configured to detect a temperature of an air taken from an intake port into an air flow passage;

an indoor air temperature sensor configured to detect an indoor air temperature Tin that is a temperature of an air in a vehicle compartment;

a blowing temperature sensor configured to detect a temperature of an air blowing from a blowing outlet to the vehicle compartment;

a discharge pressure sensor configured to detect a discharge pressure Pd that is a pressure of a refrigerant discharged from the compressor;

a discharge temperature sensor configured to detect temperature Td of the refrigerant discharged from the compressor;

a suction temperature sensor configured to detect temperature Ts of the refrigerant sucked into the compressor;

an indoor condenser temperature sensor configured to detect an indoor condenser temperature TCI that is a temperature of the refrigerant passed through the indoor condenser or a temperature of the indoor condenser;

an indoor condenser pressure sensor configured to detect an indoor condenser exit pressure Pci that is a pressure of the refrigerant just after exiting from the indoor condenser;

a heat absorbing device temperature sensor configured to detect a heat absorbing device temperature Te that is a temperature of an air passed through a heat absorbing device or a temperature of the heat absorbing device itself;

a heat absorbing device pressure sensor configured to detect a pressure of the refrigerant in the heat absorbing device or a pressure of the refrigerant just after exiting from the heat absorbing device;

an air conditioning operating device configured to set a preset temperature and switching of an air conditioning operation;

an outdoor heat exchanger temperature sensor configured to detect a temperature TXO of the refrigerant just after being discharged from the outdoor heat exchanger;

an outdoor heat exchanger pressure sensor configured to detect a discharged refrigerant pressure PXO that is a pressure of the refrigerant just after being discharged from the outdoor heat exchanger; and a heat medium temperature sensor configured to detect temperature Tw that is a chiller water temperature of a heat medium exited from a heat medium flow path of a refrigerant-heat medium heat exchanger and circulating through a heat medium circuit, and outputs of the heat pump ECU being connected to:

the compressor;

an outdoor blower;

an indoor blower;

an intake switching damper;

an air mix damper;

an outdoor expansion valve;

the indoor expansion valve;

one or more of solenoid valves;

an auxiliary heater; and a chiller expansion valve, wherein the controller can selectively perform a plurality of defrosting modes including:

a hot gas defrosting mode to defrost the outdoor heat exchanger by the refrigerant compressed by the compressor; and a heat absorption defrosting mode to defrost the outdoor heat exchanger by the refrigerant absorbing the heat from the heat-absorbed subject and compressed by the compressor, and the controller sets a selecting condition to preferentially select the heat absorption defrosting mode, and a switching condition to switch the heat absorption defrosting mode to the hot gas defrosting mode and performs the hot gas defrosting mode, wherein the heat absorption defrosting mode includes at least one of:

a chiller defrosting mode in which the heat absorption heat exchanger is the refrigerant-heat medium heat exchanger configured to perform a heat exchange between heat medium circulating through the heat medium circuit and the refrigerant; and a cooling cycle defrosting mode in which the heat absorption heat exchanger is the heat absorbing device configured to absorb heat into the refrigerant from air supplied to the vehicle compartment, and wherein when the temperature of the heat medium is lower than a predetermined temperature Twt2 during execution of the chiller defrosting mode, the controller actuates an auxiliary heat source provided in the heat medium circuit and configured to heat the heat medium, and when the vehicle compartment temperature is lower than a predetermined temperature Tint2 during execution of the cooling cycle defrosting mode, the controller actuates the auxiliary heat source configured to heat the air flowing into the vehicle compartment.

8. The vehicle air conditioning apparatus according to claim 7, wherein the controller is configured to:

set the selecting condition based on a temperature of the heat-absorbed subject, and preferentially select the heat absorption defrosting mode when the temperature of the heat-absorbed subject satisfies the selecting condition.

9. The vehicle air conditioning apparatus according to claim 7, wherein the controller is configured to:

set the switching condition based on one of the refrigerant pressure, the refrigerant temperature, and a period of time for which the heat absorption defrosting mode is performed; and switch from the heat absorption defrosting mode to the hot gas defrosting mode when one of the refrigerant pressure, the refrigerant temperature, and the period of time satisfies the set switching condition.

10. The vehicle air conditioning apparatus according to claim 7, wherein the controller is configured to:

set the selecting condition based on the temperature of the heat medium flowing through the refrigerant-heat medium heat exchanger, and select the chiller defrosting mode when the temperature of the heat medium flowing through the refrigerant-heat medium heat exchanger is equal to or higher than the predetermined temperature Twt1.

11. The vehicle air conditioning apparatus according to claim 7, wherein one of a state in which the refrigerant temperature is equal to or higher than a preset threshold temperature Trt3, and a state in which the refrigerant pressure is equal to or higher than a preset threshold pressure Prt3 continues for a predetermined period of time TP2, the controller ends a defrosting mode.

\* \* \* \* \*